(12) United States Patent
Periyathambi et al.

(10) Patent No.: US 11,544,177 B2
(45) Date of Patent: Jan. 3, 2023

(54) MAPPING OF TEST CASES TO TEST DATA FOR COMPUTER SOFTWARE TESTING

(71) Applicant: eBay Inc., San Jose, CA (US)

(72) Inventors: Ramesh Periyathambi, San Ramon, CA (US); Tomer Lancewicki, Jersey City, NJ (US); Senthil Kumar Padmanabhan, San Jose, CA (US); Srikanth Rentachintala, San Jose, CA (US); Kandakumar Doraisamy, Dublin, CA (US)

(73) Assignee: EBAY INC., San Jose, CA (US)

( * ) Notice: Subject to any disclaimer, the term of this patent is extended or adjusted under 35 U.S.C. 154(b) by 78 days.

(21) Appl. No.: 16/952,721

(22) Filed: Nov. 19, 2020

(65) Prior Publication Data

US 2022/0156175 A1    May 19, 2022

(51) Int. Cl.
| | |
|---|---|
| *G06F 11/36* | (2006.01) |
| *G06F 21/62* | (2013.01) |
| *G06F 16/22* | (2019.01) |
| *G06F 40/40* | (2020.01) |
| *G06Q 10/06* | (2012.01) |
| *G06N 20/00* | (2019.01) |

(Continued)

(52) U.S. Cl.
CPC .......... *G06F 11/3688* (2013.01); *G06F 16/22* (2019.01); *G06F 21/6254* (2013.01); *G06F 40/40* (2020.01); *G06N 5/04* (2013.01); *G06N 20/00* (2019.01); *G06Q 10/06395* (2013.01); *G06Q 30/0623* (2013.01)

(58) Field of Classification Search
CPC ...... G06F 11/3688; G06F 16/22; G06F 40/40; G06F 21/6254; G06N 20/00; G06N 5/04; G06Q 10/06395; G06Q 30/0623

USPC ......................................................... 717/126
See application file for complete search history.

(56) References Cited

U.S. PATENT DOCUMENTS

| | | | |
|---|---|---|---|
| 10,002,375 B1 * | 6/2018 | Scythes | G06Q 30/0623 |
| 10,585,786 B1 * | 3/2020 | Padaki | G06F 11/368 |

(Continued)

OTHER PUBLICATIONS

Az-zahra et al., "Evaluating E-marketplace Mobile Application Based on People at the Center of Mobile Application Development (PACMAD) Usability Model", 2019, [Online], pp. 71-77, [Retrieved from internet on Aug. 19, 2022], <https://ieeexplore.ieee.org/stamp/stamp.jsp?arnumber=8986067> (Year: 2019).*

(Continued)

*Primary Examiner* — S. Sough
*Assistant Examiner* — Zengpu Wei
(74) *Attorney, Agent, or Firm* — Shook, Hardy & Bacon L.L.P.

(57) ABSTRACT

A first test case identifier that indicates a first test case is received. The first test case is indicative of testing one or more features of an application associated with the electronic marketplace. The first test case identifier is compared to a plurality of attributes. The plurality of attributes are associated with one or more listings that describe one or more items for sale in an electronic marketplace. Based at least in part on the comparing, it is determined that a first set of attributes, of the plurality of attributes, are test data candidates to be used as input to the first test case. Based at least in part on the determining, the first test case is caused to be run using at least one of the first set of attributes as test data for input.

20 Claims, 11 Drawing Sheets

(51) Int. Cl.
*G06N 5/04* (2006.01)
*G06Q 30/06* (2012.01)

(56) References Cited

U.S. PATENT DOCUMENTS

| | | | | |
|---|---|---|---|---|
| 2006/0095521 | A1* | 5/2006 | Patinkin | H04L 51/12 709/206 |
| 2007/0226691 | A1* | 9/2007 | Happell | G06F 11/368 717/124 |
| 2012/0030515 | A1* | 2/2012 | Birakoglu | G06F 11/368 714/E11.208 |
| 2014/0026125 | A1* | 1/2014 | Pasala | G06F 11/3684 717/126 |
| 2015/0378828 | A1* | 12/2015 | Moncelle | G06F 16/245 707/640 |
| 2017/0060734 | A1* | 3/2017 | Raz | G06F 11/3692 |
| 2019/0384699 | A1 | 12/2019 | Arbon et al. | |
| 2020/0201833 | A1* | 6/2020 | Yang | G06F 16/2379 |
| 2020/0311790 | A1* | 10/2020 | Keren | G06F 16/2379 |
| 2021/0026982 | A1* | 1/2021 | Amarendran | G06F 21/6218 |

OTHER PUBLICATIONS

"Evaluating NLP: Assembling a Test Dataset—Rosette Text Analytics", Retrieved from the Internet URL: <https://www.rosette.com/blog.evaluating-nlp-assembling-a-test-dataset/>, Feb. 11, 2020, 5 pages.

Lavanya, "Smart Test Automation using NLP", Retrieved from the Internet URL: <https://dev.to/lvnya_c/smart-test-automation-using-nlp-h9b>, May 22, 2019, 6 pages.

Sharma, "Natural Language Processing (NLP)Based Test Automation", Retrieved from the Internet URL: <https://testsigma.com/blog/natural-language-processing-nlp-based-test-automation/>, Aug. 2, 2019, 4 pages.

Hourani et al., "The Impact of Artificial Intelligence on Software Testing", 2019 IEEE Jordan International Joint Conference on Electrical Engineering and Information Technology (JEEIT), Apr. 2019, 6 pages.

Huixia et al., "An Automatic Test Data Generation Method for Microservice Application", 2020 International Conference on Computer Engineering and Application (ICCEA), Mar. 2020, pp. 188-191.

Khari et al., "A Novel Approach for Software Test Data Generation Using Cuckoo Algorithm", ICTCS '16 Proceedings of the Second International Conference on Information and Communication Technology for Competitive Strategies, Mar. 2016, 6 pages.

Wang et al., "Automatic Generation of Acceptance Test Cases from Use Case Specifications: an NLP-based Approach", IEEE Transactions on Software Engineering (Early Access), May 18, 2020, 37 pages.

Zhang et al., "A New Method for Software Test Data Generation Inspired by D-algorithm", 2019 IEEE 37th VLSI Test Symposium (VTS), Apr. 2019, 6 pages.

Voulivasi et al., "Test Routine Automation through Natural Language Processing Techniques", School of Electrical and Computer Engineering Department of Electronics and Computers, 2018, 67 pages.

* cited by examiner

| Test Case Identifiers | Expected output (test data candidates) |
|---|---|
| mWeb Picture panel - Single image | NUMBER_OF_PICTURES=1 |
| mWeb Picture Panel - 2 images | NUMBER_OF_PICTURES=2 |
| mWeb Picture panel - 6 images | NUMBER_OF_PICTURES=6 |
| Image element exists | NUMBER_OF_PICTURES>0 |
| Tapping image launches gallery view that is dismissable | NUMBER_OF_PICTURES>0 |
| Gallery view can be toggled between full size & grid layout | NUMBER_OF_PICTURES>0 |
| Multiple images can be swiped through - image counter is correct | NUMBER_OF_PICTURES>0 |
| [Auction Item Only] Bid Count: Present & Correct | AUCTION_FORMAT AND BID_COUNT>0 |
| Remaining Time: Present & Correct | TIME_REMAIN>0 |
| [MSKU Only] Variations Drop Down: Present & Correct | MSKU_TRAITS_COUNT>0 OR MSKU_VARIATION_COUNT>0 |
| [Multiple Quantity Only] Quantity Picker: Present & Correct | MULTIQTY |
| Why To Buy Signals: Present & Correct | WTB_SIGNAL_IDS_SHOWN NOT NULL |
| Discount Percentage: Non-MSKU: Present & Correct | MSKU_TRAITS_COUNT IS NULL AND (MAP OR STP OR MKD_MGR_SHIP) |
| No Discount Percentage: Non-MSKU: Present & Correct | MSKU_TRAITS_COUNT IS NULL AND NOT (MAP OR STP OR MKD_MGR_SHIP) |
| Free Shipping treatment | FREE_SHIPPING |
| Non-Free Shipping treatment | NOT FREE_SHIPPING |
| Item is out of stock | NUM_AVBL_QUANTITY=0 |
| Returns information should be part of the bulleted list in the item card | RETURN_POLICY_DURATION>0 |
| Apple Pay / Google Pay display as payment methods for P2.0 listings in ATF | PAYMENT_METHODS=GOOGLE_PAY OR APPLE_PAY |
| Apple Pay / Google Pay display as payment methods for P2.0 listings in spoke page | PAYMENT_METHODS=GOOGLE_PAY OR APPLE_PAY |
| Payments: Present & Correct | PAYMENT_METHOD IS NOT NULL |
| Authorized Seller: Present & Correct | AUTHORISED_SELLER IS NOT NULL |
| Authorized Seller: Tapping leads to webview | AUTHORISED_SELLER IS NOT NULL |
| Authorized Seller Icon is present & correct | AUTHORISED_SELLER IS NOT NULL |
| Direct from Brand: Present & Correct | BRANDED_SELLER IS NOT NULL |
| Direct from Brand: Tapping does not lead anywhere | BRANDED_SELLER IS NOT NULL |
| Direct from Brand: Icon is present & correct | BRANDED_SELLER IS NOT NULL |
| About the Seller Positive Feedback Percentage: Present & Correct | FEEDBACK_PERCENT IS NOT NULL |
| Top Rated Plus: Present & Correct | TRS_2 |
| ... | ... |

*FIG. 7.*

MAPPING OF TEST CASES TO TEST DATA FOR COMPUTER SOFTWARE TESTING

BACKGROUND

Software testing is the process of evaluating the functionality of a developed software application to find any software bugs and/or check whether the developed software application meets specified requirements (e.g., business requirements and technical design). Software testing is typically performed before the software application is deployed to end-users so that there will be better end-user satisfaction, better computer security, and better computer resource utilization, among other things.

Among various problems existing technologies have in software testing is generating or using suitable test data. Test data refers to input data used to test one or more test cases of a software application. A test case is typically a single executable test to verify a particular feature or functionality of the software application during software testing. Test data is typically used for both positive testing to verify that functions produce expected results for given inputs, and for negative testing to test software ability to handle unusual, exceptional, or unexpected inputs. Existing technologies inaccurately identify test data, inadequately perform software testing in general, and consume unnecessary computing resource consumption, among other things.

BRIEF SUMMARY

Particular embodiments of the present disclosure include a computer-implemented method, a non-transitory computer storage medium, and a system. Some aspects are directed to improving existing software testing technologies by determining or tagging a set of attributes of listings as test data candidates based at least in part on comparing a first test case identifier (e.g., a natural language description of a test case) with the set of attributes. This improves functionality and computing resource consumption, among other things. Other advantages, embodiments, improvements and the like are described herein.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein:

FIG. 7 is a table that represents various examples of test case identifiers and their mapped test data candidates, according to some embodiments.

DETAILED DESCRIPTION

Figure 1:
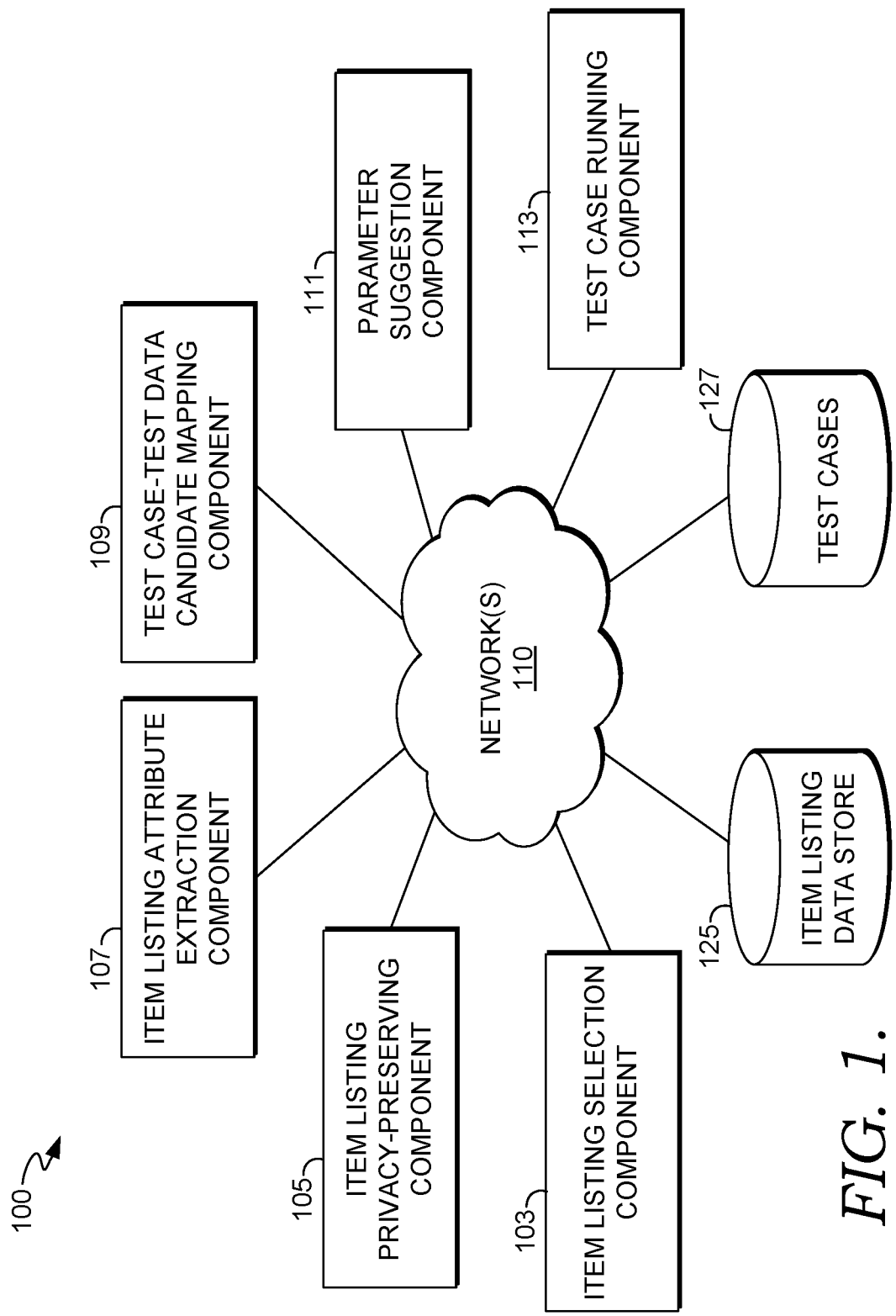
FIG. 1 is a block diagram of an illustrative system architecture, according to some embodiments.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Existing computers themselves and software testing technologies (e.g., TESTIM, ZEBRUNNER, MABL, KOBITON) are inaccurate in the identification of test data for test cases, especially in electronic marketplace contexts. Modern e-commerce software applications have multiple built-in complex functionalities. Fixing software regression and testing these functionalities is critical for the proper functioning of software applications without issues, yet existing technologies are inadequately able to identify test data and test a software application.

There are various technical problems with manual software testing technologies. Manual testing is the process of manually testing software applications for defects. It typically requires a tester to play the role of an end-user by using most of the application's features manually to ensure correct software application behavior. This also typically requires the user to manually generate or identify test data. Most of the time, executing manual tests are spent manually locating the correct item listing or its seller to fit a given test case. An item listing describes (e.g., in natural language) an item for sale in an electronic marketplace. Even after finding the correct item listing or seller for the particular manual test case, the item listing or data about the seller often becomes stale, is modified, or becomes not applicable to the test case after a period of time. For example, an item can be purchased or the seller may suspend the sale of an item between the time test data candidates are identified and running test cases. Consequently, the corresponding item listing is deleted. This means that test cases are run based on invalid or artificial data because the item listings no longer exists. This leads to inaccurate test case testing and therefore software bugs or other requirement non-conformance because instead of testing a software application based on actual test scenarios, the application is tested based on old or non-existent test scenarios.

There are also various technical problems with automated software testing technologies, such as accuracy. Various existing automated software testing technologies try to generate new item listings and/or sellers at runtime to validate that particular test case. Thus item listings are artificially created on the fly (dynamically in response to a request to run a test case) but do not typically reflect actual item listings of actual sellers. However, generating artificial item listings on the fly causes many API call failures while creating the item listing data required for the test case validation itself. This makes these automated tests unreliable and inaccurate because of the failures and the testing data does not reflect actual listings. Further, these artificial item listings tend to lack the overall quality relative to actual item listings since the item is created only to verify a given test case. Certain biases tend to formulate or there is often missing data when artificial item listings are created. For example, actual images within item listings or other complex data setup may be missing when artificial listings are created. This makes various test cases inaccurate. For example, a test case may be to test multiple-image listings but the listings in the test data may not have any images whatsoever, which is typical of artificial item listings.

These automated tests also create the same item listing and seller multiple times (every time a test case is run). Accordingly, the data becomes very redundant and not useful. For example, the same item title and price can be listed hundreds of times and a query can bring up the same set of items with the same title. Using the same item listings for multiple tests not only negatively affects accuracy, but unnecessarily consumes computer memory.

There are also computer resource consumption problems with existing automated testing technologies. As stated above, existing automated testing technologies generate artificial item listings on the fly, which causes many API call failures while creating the item listing data required for the test case. This typically slows down the regression testing process significantly by at least two to three hours. Regression testing ensures that changes to software applications have not broken existing functionality. When item listings are generated, multiple changes are requested to be made and so regression testing must be performed. Slowing regression testing and dealing with API call failures not only prolongs the release timelines of application deployment to end-users, but negatively affects computer resource consumption, such as CPU utilization and network throughput. Network throughput is the rate of successful message delivery over a communication channel. However, the rate of successful message delivery decreases because endpoints are not able to communicate with each other when there are API call failures. Further, each time an API call is made, the contents or payload of the call may be supplemented with header information or other metadata within a packet in TCP/IP and other protocol networks that must traverse over the network. Accordingly, for example, when this functionality is multiplied by all the API calls made (because there are multiple API call failures), there are throughput and latency costs by repetitively generating this metadata and trying to send it over a computer network.

Various embodiments of the present disclosure provide one or more technical solutions to the technical problems described above, as well as other problems. In operation, various embodiments of the present disclosure are directed to tagging or determining that a set of attributes of actual item listings are to be used as test data candidates for a given test case based on comparing (e.g., via NLP) an identifier associated with the given test case to the set of attributes.

In an illustrative example, a tester or programmer can input a test case identifier "free shipping treatment" into a field. Responsively, embodiments can compare this identifier to other item listing attributes that have been extracted from item listings. For example, an item listing attribute of a first item listing can include the words "no shipping cost," the price and other metadata (e.g., number of images) associated with the first item listing. Accordingly, some embodiments determine, via NLP, that "free shipping" in the test case identifier is semantically similar to the "no shipping cost" of the first item listing and responsively tags the item listing attributes (or first test case in general) as a test data candidate to be used as input to a test case that the test case identifier describes.

Various embodiments of the present disclosure improve the accuracy of manual software testing technologies because they automate test data retrieval and/or testing in general using new rules and functionality that no existing technologies use. For example, some embodiments automatically tag or determine attributes of actual item listings as test data candidates based on comparing (e.g., via NLP) test case identifier(s) to the attributes. Accordingly, a user does not have to manually generate or identify test data unlike existing technologies. Particular embodiments employ tracking statistics (e.g., a timestamp of the last user interaction, clicks, buys, etc.) for actual listings and only use those listings that have tracking activity over a threshold. This ensures that the listings used for testing is not or is less likely to become stale, is modified, or becomes not applicable to the test case after a period of time. Therefore, the accuracy is improved.

Various embodiments of the present disclosure also improve the accuracy of automated software testing technologies. Rather than generating new artificial item listings and/or sellers at runtime to validate that particular test case, particular embodiments retrieve actual item listings and seller data, which is real high quality data that contemplates testing the complex scenarios for electronic marketplace applications. Accordingly, there are no (or fewer) API call failures relative to existing technologies because listings are not actually created on the fly, but retrieved. This makes testing reliable and accurate because the testing data reflects actual listings. For example, there are less likely to be biases or missing data because real actual listings tend to contemplate all the complex situations that arise in electronic marketplaces. For example, using the illustration above, a test case may include retrieving multiple-image listings, which is feasible to do when there are real listings used because most real listings include images, and many listings contain multiple images.

Various embodiments also improve automated tests by not creating the same item listing and seller multiple times (every time a test case is run). This is because there is no such need to create the same data when there are multiple real listings and sellers that likely fit some test case fairly well. Accordingly, the data in these embodiments is not redundant and is useful. This improves accuracy and does not overconsume memory because the same data is not stored multiple times.

Various embodiments of the present disclosure also improve computer resource consumption problems. As stated above, existing automated testing technologies generate artificial item listings on the fly, which causes many API call failures while creating the item listing data required for the test case. This negatively affects computer resource consumption, such as CPU utilization and network throughput. However, because real listings and data are used there are little or no API call failures. Accordingly, the rate of successful message delivery increases because endpoints are able to communicate with each other based on no API call failures. Further, API calls are not unnecessarily multiplied (because there are no multiple API call failures), which means there are little or no throughput and latency costs by repetitively generating this metadata and trying to send it over a computer network. Rather, this metadata should be able to be successfully sent over the computer network the first time.

FIG. 1 is a block diagram of an illustrative system architecture 100 in which some embodiments of the present technology may be employed. Although the system 100 is illustrated as including specific component types associated with a particular quantity, it is understood that alternatively or additionally other component types may exist at any particular quantity. In some embodiments, one or more components may also be combined. It is also understood that each component or module can be located on the same or different host computing devices. For example, in some embodiments, some or each of the components within the system 100 are distributed across a cloud computing system (e.g., the computer environment 1000 of FIG. 10). In other embodiments, the system 100 is located at a single host or computing device (e.g., the computing device 1100 of FIG. 11). In some embodiments, the system 100 illustrates executable program code such that all of the illustrated components and data structures are linked in preparation to be executed at run-time.

System 100 is not intended to be limiting and represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, the functionality of system 100 may be provided via a software as a service (SAAS) model, e.g., a cloud and/or web-based service. In other embodiments, the functionalities of system 100 may be implemented via a client/server architecture.

The system 100 is generally directed to mapping one or more test cases to one or more test data candidates, according to some embodiments. The system 100 includes an item listing selection component 103, an item listing privacy-preserving component 105, and item listing attribute extraction component, a test case—test data candidate mapping component 107, a parameter suggestion component 109, a test case running component 113, and the item listing data store 125, each of which are communicatively coupled to the network(s) 110. The network(s) 110 can be any suitable network, such as a Local Area Network (LAN), a Wide Area Network (WAN), the internet, or a combination of these, and/or include wired, wireless, or fiber optic connections. In general, network(s) 110 can represent any combination of connections (e.g., APIs or linkers) or protocols that will support communications between the components of the system 100.

The item listing selection component 103 is generally responsible for extracting or copying a set of listings from a data store (e.g., a database, a file, a repository, a storage network, etc.), such as the item listing data store 125. In various embodiments, such listings represent live or actual electronic marketplace listings (unlike existing technologies) such that the corresponding items are currently for sale in an electronic marketplace. Electronic marketplaces typically have millions of not billions of item listings stored to computer memory corresponding to different items for sale in the electronic marketplace. However, it may be computationally infeasible to perform functionality on each listing (e.g., build indexes for each listing to make theme searchable for performing test cases). Moreover, not all item listings are new, popular, or otherwise relevant. For example, some stored listings may have been flagged to be deleted by a seller, but still remains stored to memory. Various embodiments of the present disclosure only use a subset of these listings to perform further functionality, as described in more detail herein.

In some embodiments, the item listing selection component 103 selects a subset of listings based on whether there has been some user activity data threshold that has been satisfied. "User activity" as described herein refers to the computerized user input and/or display of information to a user device associated with a user and an item. For example, user activity can include: a user selection of a listing to purchase a product of a listing (e.g., a "sale" of a product), a user selection of a listing to view the listing (e.g., a "view" of the listing), and/or the listing being displayed to a user device (e.g., an "impression" of the listing). The particular amount or quantity of user activity (referred to herein as "user activity data") for a listing is indicative of a type of demand for an item based on users' historical engagement with the item. "User activity data" as described herein refers to metrics, statistics, and/or counts of specific user activity on one or more listings, which may be indicative of demand for a particular listing or associated item. For example, user activity data can include the quantity of times a particular listing of an item has been purchased within an electronic marketplace. In another example, user activity data can include a quantity of a times that all users of an electronic marketplace select a listing to view the item.

In some embodiments, the item listing selection component 103 includes a user activity data threshold component (not shown) that is generally responsible for publishing or selecting a particular quantity of listings that has satisfied some user activity data threshold. In an example illustration of how the user activity data threshold component functions, it may only publish or render those items that have user activity data over a threshold amount (e.g., a particular quantity of views, sales, impressions, or other clicks) and/or within a threshold time period (e.g., 60 days). In this way, by selecting, via the item listing selection component 103, a subset of item listings from a larger data store of item listings when those listings are associated with user activity data over a threshold, this ensures that old, stale, deleted, or otherwise invalid listings are not used for test data in test cases, unlike existing manual software testing applications. Rather, newer and/or popular listings are used, thereby improving accuracy as described herein.

In some embodiments, the item listing selection component 103 performs its functionality by using an Extract Transform Load (ETL) functionality. ETL refers to the concept of pulling (or copying) data from one or more source databases (e.g., the item listing data store 125) and writing the pulled data into a target data store (e.g., a data warehouse). Specifically, for the "Extract" operation, data (e.g., raw data) is extracted or read from one or data sources (e.g., different types of databases). For the "Transform" operation, the read data is converted from its previous form (e.g., raw form) into the form it needs to be in so that it can be placed in another database. Transform occurs by using lookup tables, one or more rules, or combining the read data with other data. In an illustrative example of the Transform operation, several database tables of selected listings can be joined. In another example, the Transform operation can additionally or alternatively clean, sort, validate, and/or prepare the read data. For the "Load" operation, the transformed data from the "Transform" operation is then written into a target data store. For example, using the illustration above, the joined selected listings can be output in a single database table, where each record that contains a single listing and is indexed so that the single listing can be queried.

The item listing privacy-preserving component 105 is generally responsible for hiding or removing sensitive user information (e.g., from the selected subset of listings selected by the item listing selection component 103) to protect the privacy of users. For example, phone numbers, addresses, and names within item listings can all be anonymized. Hiding or removing sensitive user information can occur via any suitable computing technique. For example, computers can encrypt, obfuscate, anonymize, mask, delete, and/or otherwise remove or hide sensitive user information.

The item listing attribute extraction component 107 is generally responsible for extracting one or more attributes or attribute values from one or more listings, which may become test data candidates for one or more test cases, as described herein. For example, a listing may include an item title, as well as a price attribute value, and a short description of the corresponding item. Various embodiments extract one or more characters in the title, the price attribute value, metadata, and one or more words in the short description to use as a single test data candidate. In some embodiments, the item listing attribute extraction component 107 extracts attributes from the one or more listings based on whether the listings meet a particular user activity data threshold, as described herein with respect to the listing selection component 103. Accordingly, in some embodiments, attributes are not extracted from one or more listings when the particular user activity data threshold is not met. That is, in some embodiments, listings that do not meet the particular user activity data threshold are not selected as test data candidates. In some embodiments, attributes ae only extracted via the item listing attribute extraction component 107 after item listings have been selected via the item listing selection component 103 and/or the privacy has been preserved via the item listing privacy-preserving component 107.

The test case—test data candidate mapping component 109 is generally responsible for mapping one or more test case identifiers to test data candidates (e.g., attributes extracted from the listings via the item listing attribute extraction component 107). A "test case identifier" as described to herein is an identifier that describes a test case and/or test scenario. For example, a test case identifier can be . . . "mWeb Picture Panel—2 images." One or more of these test case identifiers can be stored to the test cases data store 127. Additionally, in some embodiments the test case—test data candidate mapping component 109 individually maps multiple test case identifiers and/or test data candidates to each other (e.g., in feature space). This helps determine how similar each test case identifier and/or test data candidates are to each other.

In some embodiments, the test case—test data candidate mapping component 109 is generally responsible for comparing one or more test case identifiers to the attributes extracted by the item listing attribute extraction component 107. Based at least in part on this comparing, the component 109 tags (or determines) a first set of attributes (of the extracted attributes) as test data candidates to be used as input to one or more test cases associated with the compared test case identifiers. For example, embodiments can use Natural Language Processing (NLP) techniques to compare an identifier that describes a test scenario with an identifier that describes a listing. In an illustrative example, a listing may have 2 images, where "2 images" is an attribute of the listing. The test case—test data candidate mapping component 109 tags "2 images" as a test data candidate for a test case identifier that reads "mWeb Picture Panel—2 images" based on NLP or other functionality that determines the content of the attributes and the test case and determines that these are similar identifiers. In this way, when the test case is run, it can use the listing with the "2 images" as input to test the test case that requires testing listings with 2 images.

In some embodiments, the test case—test data candidate mapping component 109 determines, via NLP, semantic relationships among different words, which includes determining what words have a same or similar (e.g., within a threshold distance when the word represent vectors) meaning even if they are syntactically different. This is to say, semantic similarity between listing attributes and/or test case identifiers can be determined even if they are syntactically different. "Syntax" or syntactic properties refers to the structure of character sequences of the content (as opposed to the semantics or meaning), such as the structure of a sentence. For example, "car" and "far" are syntactically similar but have two different definitions so they are not semantically similar. Rather, "far" and "distant" are semantically similar because they mean the same thing, even though they are structurally or syntactically different.

In some embodiments, the test case—test data candidate mapping component 109 uses NLP by tokenizing item listings and/or test case identifiers into their constituent words, numbers, symbols, and some or each of the words are tagged with a part-of-speech (POS) identifier. "Tokenization" or parsing in various embodiments corresponds to a computer-implemented process that segments the content into words, sentences, symbols, character sequence, and/or other elements of the content. This can include a set of rules for analyzing a message, such as word and/or part of speech (POS) order. For example, for the sentence "the girl jumped happily", the syntax may correspond to a word order where the structure is subject-verb-adverb (or subject, verb, object, etc.). In various embodiments, each word of a listing (or attributes extracted by the item listing attribute extraction component 107) and/or test case identifier is tagged with such POS identifiers.

In some embodiments, NLP derives semantic and syntactic content of semi-structured or unstructured data (e.g., data in item listings, data in image files, data in blogs, posts, websites, text descriptions of classifier models, etc.). This is in contrast to analyzing "structured" data, such as data in a database. NLP can be configured to parse content to determine semantic context (e.g., meaning of words by analyzing each word in listings/test case identifiers against each other and against training data) and syntax context (e.g., the set of rules that govern structure of sentences in a given language). NLP is configured to recognize keywords, contextual information, and metadata tags associated with one or more portions of a set of data. In certain embodiments, NLP analyzes summary information, keywords, text descriptions included in the set of data, and uses syntactic and semantic elements present in this information to identify the interest contexts. The syntactic and semantic elements can include information such as word frequency, word meanings, text font, italics, hyperlinks, proper names, noun phrases, parts-of-speech (e.g., noun, adverb, adjective, and the like) and/or the context of surrounding words. Other syntactic and semantic elements are also possible.

In some embodiments the test case—test data candidate mapping component 109 additionally or alternatively uses other NLP-based functionality, such as Named Entity Recognition (NER). NER is an information extraction technique that identifies and classifying elements or "entities" in natural language text into predefined categories. Such predefined categories may be indicated in corresponding tags or labels. In various embodiments, NER (and NLP in general) thus transforms unstructured data to data that is structured, and therefore machine-readable and available for processing. Entities can be, for example, names of people, specific organizations, specific locations, specific times, specific quantities, specific monetary price values, specific percentages, and the like. Likewise, the corresponding tags or labels can be "people," "organizations," "location,", "time," "price" and the like. In this context of the present disclosure, for example, these tags or labels can indicate whether certain extracted attributes correspond to a "price" of an item, the entity of the item itself, and the like.

In some embodiments, the test case—test data candidate mapping component 109 additionally or alternatively uses word embeddings to tag or determine that a set of attributes of one or more listings as test data candidates for a given test case. In this way, different words or other characters in listings and test case identifiers (or test scenarios) can be converted into feature vectors of numerical values and embedded in feature space based on how semantically similar (e.g., via cosine or Euclidian distance) each word or other character sequence is to each other. In various embodiments, such word embeddings are produced by WORD2VEC, GloVe, and/or any other suitable word embedding models.

A "word embedding" as described herein includes vectors in feature space (e.g., also known as vector space or linear space) based on a contextual (e.g., semantic) similarity, feature similarity, and/or other similarity. In some embodiments, two or more vectors that are semantically similar (e.g., have the same or similar meaning) may be mapped or embedded near each other in vector space regardless of the syntactic similarity (e.g., similarity between word structure or appearance). Through this semantic relationship functionality, computers can understand how similar listings (or extracted attributes of listings) are to each other and/or how similar they are to test case identifiers (e.g., via cosine distance).

A "feature vector" (also referred to as a "vector") as described herein includes one or more real numbers, such as a series of floating values or integers (e.g., [0, 1, 0, 0]) that represent one or more other real numbers, a natural language (e.g., English) word and/or other character sequence (e.g., a symbol (e.g., @, !, #), a phrase, and/or sentence, etc.). Such natural language words and/or character sequences correspond to the set of features and are encoded or converted into corresponding feature vectors so that computers can process the corresponding extracted features.

In some embodiments, the test case—test data candidate mapping component 109 additionally or alternatively is or uses one or more machine learning models to generate a particular decision statistic prediction (e.g., a classification prediction of a classifier model, a clustering prediction of a clustering model, or a regression prediction for a regression model). For example, a clustering model can use NLP, a word embedding, and/or other attributes extracted by the item listing attribute extraction component 107 (e.g., price) as input to predict whether a particular test case identifier and/or set of attributes falls under the same cluster (e.g., "2 images"). Such cluster may be indicative of whether to map certain test case identifiers to test data. Such machine learning model(s) may be any suitable model of any suitable type. For example, such machine learning model can be supervised or unsupervised and can be or include a neural network (e.g., a Convolutional Neural Network (CNN) or Siamese Neural Network), decision trees, random forests, support vector machine, Naïve Bayes, and or clustering (e.g., K-means clustering).

In some embodiments, the test case—test data candidate mapping component 109 (or the machine learning model(s) it uses) provides various vectors of training data as input. In various embodiments, this component 109 classifies or otherwise predicts, via one or more machine learning models, whether attributes of a listing and/or test case identifier belongs to certain classes or categories In certain embodiments, These prediction or target classifications may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem.

Certain embodiments can learn the parameters of the machine learning model(s) so that similar features of the input are closer to each other in vector space (e.g., all item listings that that are within a threshold price range are closer to each other in feature space). In some embodiments, this training is done in supervised manner using a loss function (e.g. Triplet loss or GE2E loss) that try to map similar features into one classification or cluster. Once the model is trained, embodiments can represent a feature vector in vector space by aggregating (e.g. mean/median or dot product) the features of the inputs obtained by passing these inputs through the trained model. For example, in supervised learning contexts, a training component can receive user input of an item listing and a specific label, such as "return policy Y listing" and like that indicates the listing includes return policy Y. Embodiments, can then run the listings with the corresponding labels through a machine learning model so that different feature values are learned according to the label. In this way, when a listing or test case identifier is received, corresponding weights or features can be learned.

In some embodiments, the training component learns features from the inputs in the and responsively weights them during training. A "weight" in various instances represents the importance or significant of a feature or feature value for prediction. For example, each feature may be associated with an integer or other real number where the higher the real number, the more significant the feature is for its prediction. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores, which are described in more detail below. In many instances, only a selected set of features are primarily responsible for a determination of whether a query and/or search result candidate is predicted to be an accessory or sub-accessory.

In another illustrative example of a training component, some embodiments learn an embedding of feature vectors based on deep learning to detect similar features between listing attributes and test case identifiers in feature space using distance measures, such as cosine (or Euclidian) distance. For example, each labeled listing or test case identifier is converted from string or other form into a vector (e.g., a set of real numbers) where each value or set of values represents the individual features of the listing or test case identifier in feature space. Feature space (or vector space) is a collection of feature vectors that are each oriented or embedded in space based on an aggregate similarity of features of the feature vector. Over various training stages or epochs, certain feature characteristics for each input can be learned or weighted. For example, for a first set of listings, the most prominent feature may be its price, whereas other features change considerably or are not present, such as color of the item. Consequently, patterns of price can be weighted (e.g., a node connection is strengthened to a value close to 1), which is indicative of the label taking on this feature. In this way, embodiments learn weights corresponding to different features such that similar features found in inputs contribute positively for predictions.

The parameter suggestion component 111 is generally responsible for recommending test data for certain test cases based on the results of the test case—test data candidate mapping component 109. For example, in response to receiving a test case, and running the test case through a NLP model, it is determined (e.g., by the test case—test data candidate mapping component 109) what test data candidate (or set of test data candidates) that the test case is closest to in feature space. In response to this determination, the parameter suggestion component 111 recommends the test data candidate(s) that are the closest to the corresponding test case identifier as dynamic parameter suggestions for the test case.

The test case running component 113 is generally responsible for running an actual test case. In some embodiments, the test case running component 113 takes the output by provided by the parameter suggestion component 111 (e.g., the output of an NLP model) and adds the suggested parameters as annotations (e.g., comments) to the test code of a particular test case. Program "annotations" are typically not executable code by a processor but is rather natural language instructions or notes for programmers to use. In this way, programmers can view, in natural language, recommended test data so that they can decide whether to import the suggested test data to particular test cases. Alternatively or additionally, in some embodiments, the test case running component 113 takes the output by provided by the parameter suggestion component 111 and automatically adds the suggested parameters as executable test data code to a particular test case (e.g., without developer annotations or feedback).

In some embodiments the system 100 includes a presentation component (not shown) that is generally responsible for causing presentation of content and related information to user devices, such as a recommended set of attributes or item listings for a given test case as determined by the test case-test data candidate mapping component 109. The presentation component may comprise one or more applications or services on a user device, across multiple user devices, or in the cloud. For example, in one embodiment, presentation component manages the presentation of content to a user across multiple user devices associated with that user. Based on content logic, device features, associated logical hubs, inferred logical location of the user, and/or other user data, presentation component may determine on which user device(s) content is presented, as well as the context of the presentation, such as how (or in what format and how much content, which can be dependent on the user device or context) it is presented and/or when it is presented.

In some embodiments, the presentation component generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, the presentation component generates structured data, tagged data or otherwise causes presentation of structured or tagged data that was previously unstructured, semi-structured, or untagged. For example, in some embodiments the presentation component causes presentation of NER and/or POS tags, as described with respect to the test case—test data candidate mapping component 109, which may have been previously unstructured or otherwise been in a different form (e.g., existed only in natural language form) than the output provided by the presentation component. In this way, some embodiments convert input data to an output that is different than the input.

Figure 2:
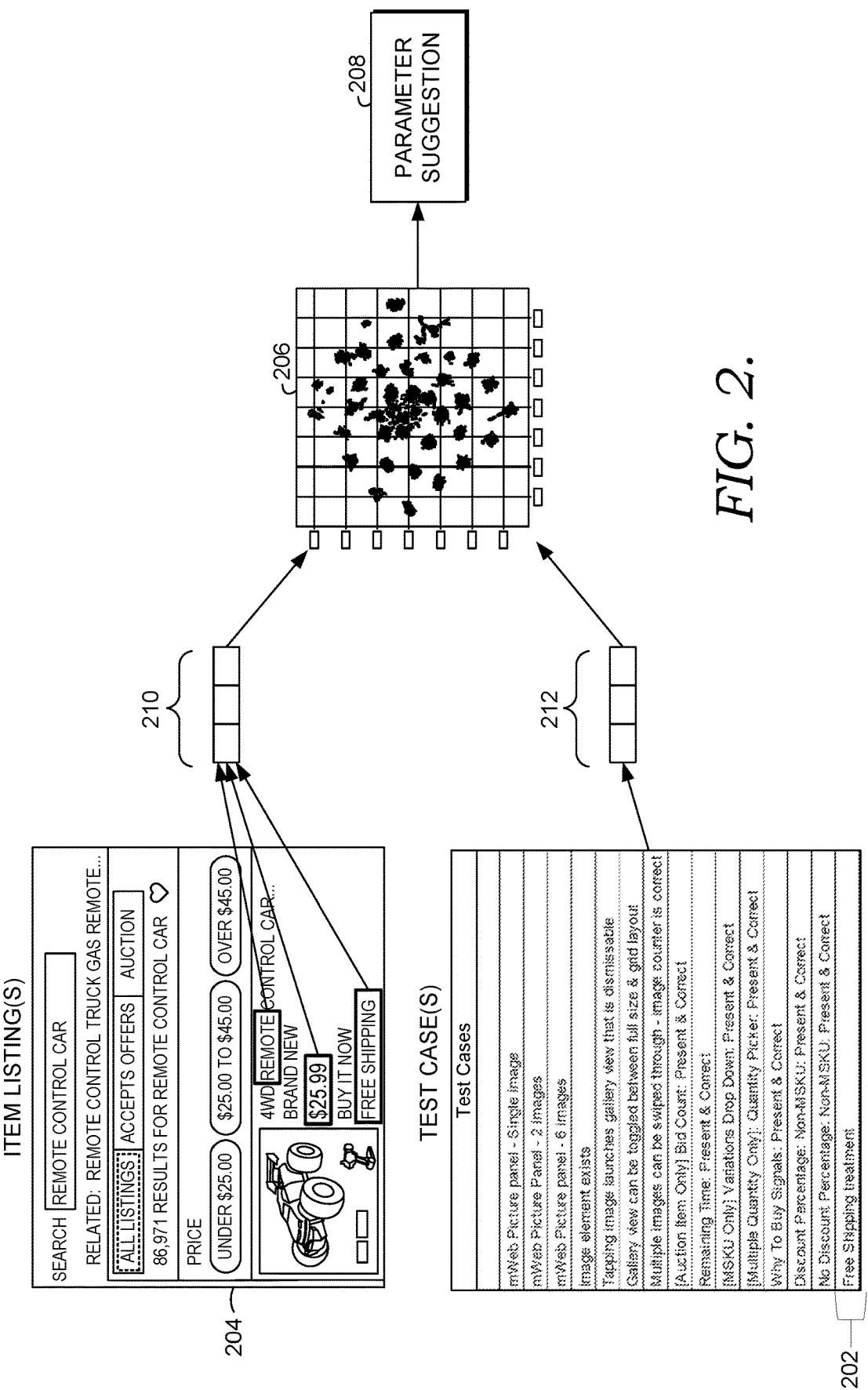
FIG. 2 is a schematic diagram illustrating how attributes of an item listing and test case identifiers are extracted an analyzed for parameter suggestion, according to embodiments.

FIG. 2 is a schematic diagram illustrating how attributes of an item listing and test case identifiers are extracted an analyzed for parameter suggestion, according to embodiments. As illustrated in FIG. 2, different attributes, such as natural language characters (e.g., "free shipping" and "$25.99") from the item listing 204 are extracted, tokenized, and converted into a feature vector 210 that is embedded in the feature space 206. In some embodiments, such extraction and conversion into a feature vector is performed by the item listing attribute extraction component 107 of FIG. 1 and/or the test case test data candidate mapping component 109.

As illustrated in FIG. 2, a test case identifier 202 (i.e., "free shipping") is also converted (e.g., by the test case—test data candidate mapping component 109), from natural language characters, into a feature vector 212 and embedded in the feature space 206. In this way, for example, embodiments can receive the test case identifier 202 and determine a distance (e.g., a Euclidian distance) between the feature vector 212 representing the test case identifier 202 and another set of feature vectors (e.g., the feature vector 210 representing the item listing attributes of the item listing 204). Responsively, in some embodiments the parameter suggestion functionality 208 selects which item listing feature vectors is closest in distance to the feature vector 212. For example, the feature vector 210 may be closest in distance to the feature vector 212. Accordingly, the parameter suggestion functionality 208 will suggest to use the item listing 204, the attributes extracted from the item listing 204, and/or other tags that indicate such extracted attributes as test data candidates for input into a particular test case indicated by the test case identifier 202.

In some embodiments the parameter suggestion functionality 208 includes the functionality as described with respect to the parameter suggestion component 111 of FIG. 1. In some embodiments, the feature space 206 represents a word embedding or other NLP-based embedding. Alternatively or additionally, in some embodiments feature space 206 represents other machine learning space, such as clustering space and the like.

Figure 3:
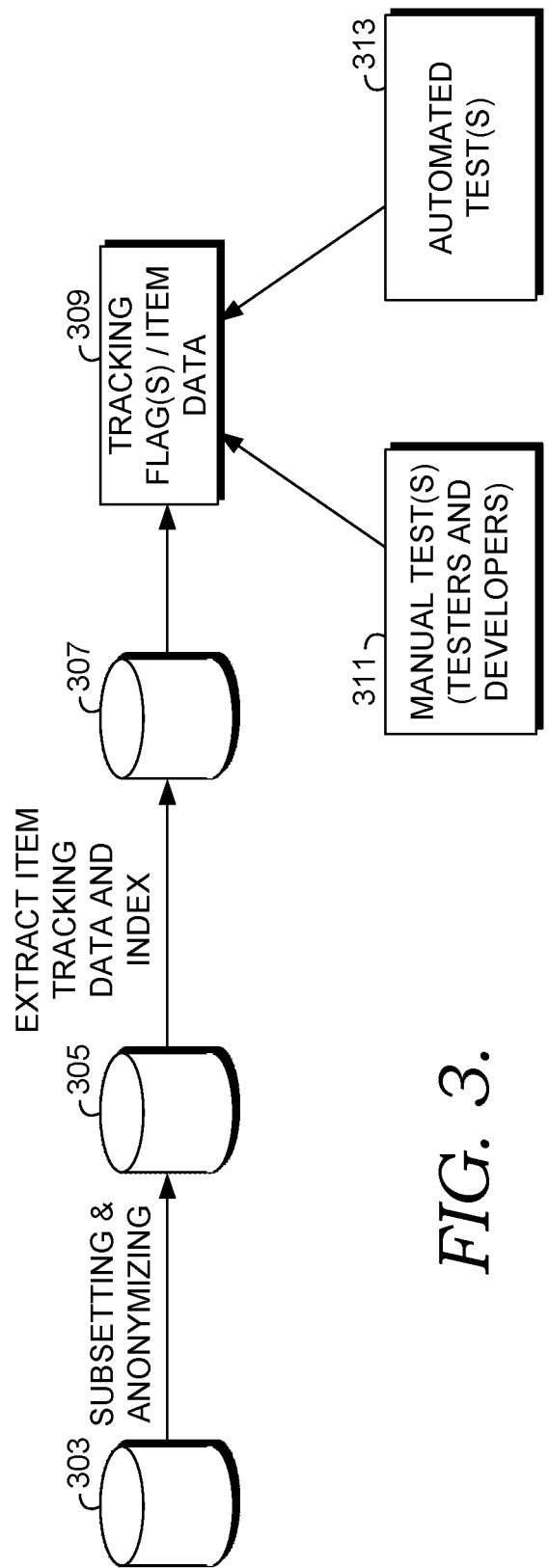
FIG. 3 is a schematic diagram for generating tracking flags and/or item listing data that represents test data candidates, according to some embodiments.

FIG. 3 is a schematic diagram for generating tracking flags and/or item data that represents test data candidates, according to some embodiments. The data store 303 includes various item listings that described products for sale in an electronic marketplace. Various embodiments select a subset of the item listings in the data store 303 and copy them to the data store 305. In some embodiments, such copying is performed by the item listing selection component 103. Some embodiments additionally anonymize the subset of listings at the data store 305 (e.g., as described with respect to the item listing privacy preserving component 105 of FIG. 5). In some embodiments, the copying of a subset of listings from data store 303 to 305 is performed by an ETL or other process where the data store 305 is a staging database and the data store 303 is a production database. The staging database is an intermediate storage area used for data processing (e.g., during ETL). The staging database sits between the data source (i.e., the data store 303) and the data target (i.e., the data store 307) (e.g., a data warehouse, data mart, or other repository). In an illustrative example, the data store 303 can contain 1.5 billion listings and embodiments can copy 1.5 million listings from the data store 303 to the staging data store 305 and additionally anonymize sensitive user data at the data store 305.

Various embodiments (e.g., the item listing attribute extraction component 107) then copy the listings from the data store 305 to the data store 307 and then provide additional tags, flags, indexes, and/or other structures to all of the listings in the data store 307. Some embodiments, for example, extract tracking flag(s) and item data (e.g., item/seller tag(s)) from the listings and generate corresponding flags or tags. A "tracking flag" refers to metadata associated with a listing, such as the number of pictures used in the listing, the shipping type used, the number of words in a title, etc. In some instances, tracking flags are hidden or not readily present or viewable on a listing. In an illustrative example of a tracking flag, it can be the following metadata natural language words: "NUMBER-OF-PICTURES," (e.g., not viewable in a listing) "RETURN_POLICY_DURATION". "Item data" refers to one or more attributes that describe or indicate one or more features of an item listing and/or seller of an item described by the item listing. For example, item data can be tags of "PRICE," a particular item title payload (e.g., "BRAND A, MODEL B TOY CAR FOR SALE $15), or description of an item for sale, or any information, for example visible in the listing 204 of FIG. 4.

Any of the tracking flags and/or item data can be all or part of the "attributes" that are extracted and/or the "test data candidates," as described herein. For example, the tracking flags and/or item data can be the attributes extracted by the item listing attribute extraction component 107 of FIG. 1, the attributes that are extracted from the item listing 204 and converted into the feature vector 210 of FIG. 2, and/or the test data candidates recommended by the parameter suggestion functionality 208 of FIG. 2.

Some embodiments additionally build an index for and structure the attributes in one or more each record, where each record includes all attributes of a particular listing (e.g., all tracking flags and item data). In this way, each record can be queried. An index, such as a database index, is a data structure that improves the speed of data retrieval (e.g., on a column order). Examples of such indexes include a bitmap index, a dense index, a sparse index, and a reverse index.

As illustrated in FIG. 3, the output is a particular record 309 that includes the tracking flag(s)/item data, which can be queried by a developer or other user issuing a manual software test 311 and/or can be queried by an automated software test 313. In some embodiments, the record 309 (and/or the data store 307) is stored or managed by a separate service (e.g., a discovery service cloud computing node) relative to the functionality performed by an electronic marketplace or via the data store 303 and data store 305. Accordingly, for example, an electronic marketplace compute node can communicate, over a network and via an API, the information contained in the data store 307 to a discover service node such that the discovery service node manages any queries requesting particular test data candidates in response to particular test case inputs. For example, a developer may input the test case identifier 202 into a field, which is a request to locate matching (e.g., via NLP) test data. Responsively the discovery service node (e.g., performing the mapping in feature space 206 and the parameter suggestion 208 or via the test case test data candidate mapping component 109) may determine that the record 309 contains the appropriate test data to use. In other embodiments, however, there is no discovery service and the electronic marketplace performs all of the functionality.

An illustrative example of the record 309 is below, which includes a combination of each tracking flag and item data of an item and seller of a single item listing:

```
[
  {
 "[ACTIVE, ADD_TO_CART, BIN_AMOUNT, CART_ELIGIBLE, CURRENT_PRICE,
 DAILY_DEAL, ENLARGE, FEEDBACK_PERCENT, FIRST_MAIN_IMAGE_SIZE_BUCKET,
 FIXED_PRICE_FORMAT, FREE_SHIPPING, GUEST_ELIGIBLE, ITEM_ATTR_COUNT,
 ITEM_CONDITION, ITEM_ID, ITEM_TITLE, ITEM_VERSION_ID, L1, L2, LEAF,
 MAX_BIBO_SIZE_AVAILABLE, MAX_MAIN_IMAGE_SIZE_BUCKET , META,
 MSKU_TRAITS_COUNT, MSKU_VARIATION_COUNT, MULTIQTY,
 NUMBER_OF_ENLARGE_PICTURES , NUMBER_OF_PICTURES ,
 NUMBER_OF_ZOOM_PICTURES, NUM_AVBL_QUANTITY, PAYMENT_METHODS,
 PAYMENT_VERSION, QUANTITY_SOLD, RETURN_POLICY,
 RETURN_POLICY_DURATION, REVISED, SALE_TYPE, SELLER_FEEDBACK_SCORE,
 SELLER_ID, SELLER_NAME, SELLER_STORES, SHIPPING_COST_PLAN_TYPE,
 SHIPPING_METHOD_CATEGORY, SHIPPING_METHOD_CODE, SHIPPING_PLAN_TYPE,
 SUBTITLE, SWC_EMBG, SWC_PROGRAM_COUNT, TIME_REMAIN,
 VI_COBRANDED_SECTION, VI_QUANTITY_REMAINING, WTB_SIGNAL_IDS_SHOWN,
 ZOOM] ": 1
  },
```

It is understood that this tracking flag(s)/item data combination is representative only and that it can include additional or other information, such as actual values of attributes. For example, where it says "CURRENT PRICE," the price of "$25.00" may be listed. In some embodiments, the record 309 is in a different format relative to the format structured by the electronic marketplace. For example, the data stores 303 and 305 may store item listing data, but the record 309 may only include a subset of the listing data, be stored using different data structures (e.g., records), be stored using additional indexes (e.g., to be queried by the discovery service), and/or include relatively different data. An example of the different format is the illustrative example above of the record 309, which includes the tracking flag(s)/item data, which is not the same format as the corresponding listing is stored to, for example, the data store 303.

Figure 4:
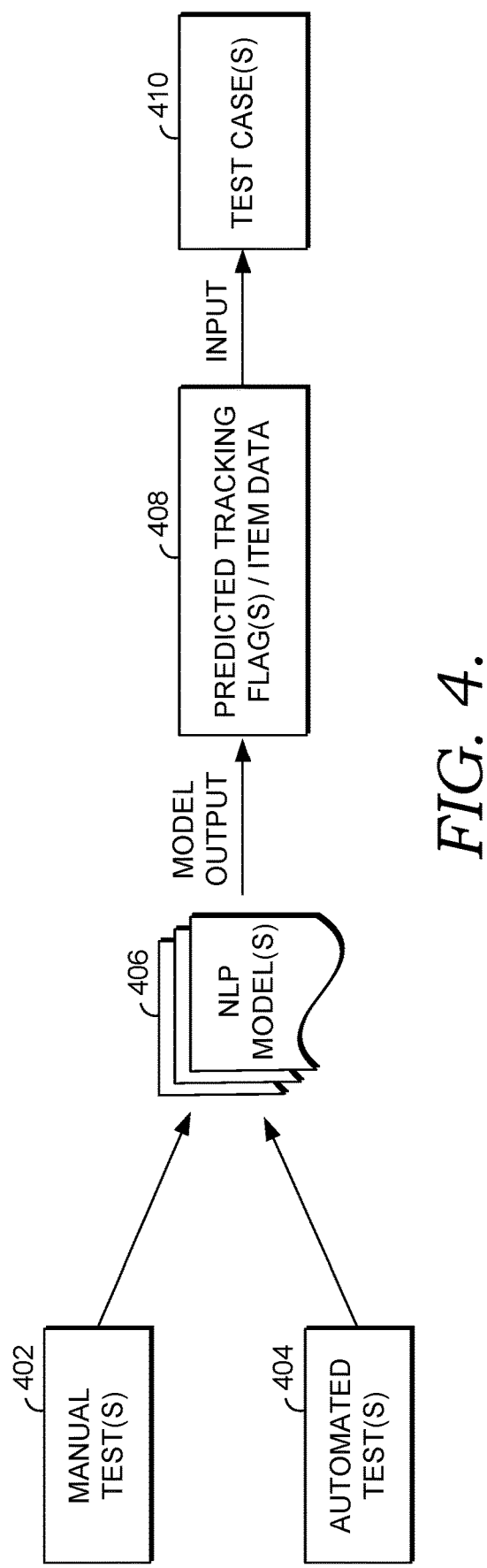
FIG. 4 is a schematic diagram illustrating how it is determined what test data to use for a given test case, according to some embodiments.

FIG. 4 is a schematic diagram illustrating how it is determined what test data to use for a given test case, according to some embodiments. Specifically, FIG. 4 illustrates that that one or more machine learning models using NLP techniques are used to map test case identifiers or tags to predicted tracking flags and/or item/seller tags (e.g., the test data candidates).

One or more test case identifiers from the manual test(s) 402 and/or automated test(s) 404 are processed the one or more NLP models 406 (e.g., encoded into feature vectors and embedded in feature space). In some embodiments, the manual test(s) 402 represents the manual test(s) 311 of FIG. 3 and vice versa. In some embodiments, the automated test(s) 404 represents the automated test(s) 313 of FIG. 3 and vice versa. In an illustrative example of the manual test(s) 402, a tester or developer may many input a test case identifier describing or indicating a particular test case (or test scenario). For example, a developer may input the string, "Item is out of stock," in a search field. In an illustrative example of the automated test(s) 404, embodiments can automatically receive (without tester or developer input) the test case identifier "Item is out of stock" based on an upload of a file.

In some embodiments, the test case identifiers input from the manual test(s) 402 or the automated test(s) 404 are converted from natural language form and encoded into one or more feature vectors. Such feature vectors can be embedded or otherwise placed in feature space, as described in more detail below. In some embodiments, the NLP model(s) 406 represents Bi-directional Encoder Representations from Transformers (BERT) model(s), Robustly Optimized BERT Pre-training Approach (ROBERTA) model(s), GPT-3 model(s), ALBERT model(s), XL Net model(s), WORD2VEC model(s), GloVe model(s), and/or any suitable model that processes natural language characters to compute relationships among different natural language characters.

In various embodiments, before the test case identifiers are received, the feature space of the NLP model(s) 406 can be trained with various feature vectors representing tracking flag(s)/item data (and/or test case data candidates) already placed in feature space (e.g., according to semantic similarity between one or more terms of the tracking flag(s)/item data). In this way, in response to the test case identifier(s) being received from the test(s) 402 and/or 404, one or more characters of the test case identifiers can be embedded or placed in feature space according to the semantic similarity relative to one or more terms of the test data candidates (i.e., the tracking flag(s)/item data). For example, a distance (e.g., Euclidian distance or Cosine distance) can be computed between a feature vector representing a test case identifier and one or more of the feature vectors representing test data candidates.

In some embodiments, in response to determining, via the NLP model(s) 406, that a feature vector representing a test data candidate (or set of feature vectors representing a set of test data candidates) is closest in distance (or is within a threshold distance) in feature space to the feature vector representing a particular test case, particular embodiments output such test data candidate (or set of test data candidates) in natural language form as test data candidate(s) 408, which includes the predicted tracking flag(s)/item data. In some embodiments, the predicted tracking flag(s)/item data 408 represent the record 309 of FIG. 3 and vice versa.

In some embodiments, all of the functionality of the automated test(s) 404 is automatically performed without any user interaction in FIG. 4. Accordingly, in some embodiments, the NLP model(s) 406 process test case identifiers and generate the test data candidate(s) at 408 and automatically provide, as input, the test data candidates, into the test case(s) 410. Alternatively, some of the functionality of the manual test(s) 402 is performed manually (and not automatically). For example, some embodiments send the test data candidate 408 as a notification to a developer and the developer can manually input the test data candidate 408 into the test case(s) 410 (e.g., via the manual test(s) 402).

Figure 5:
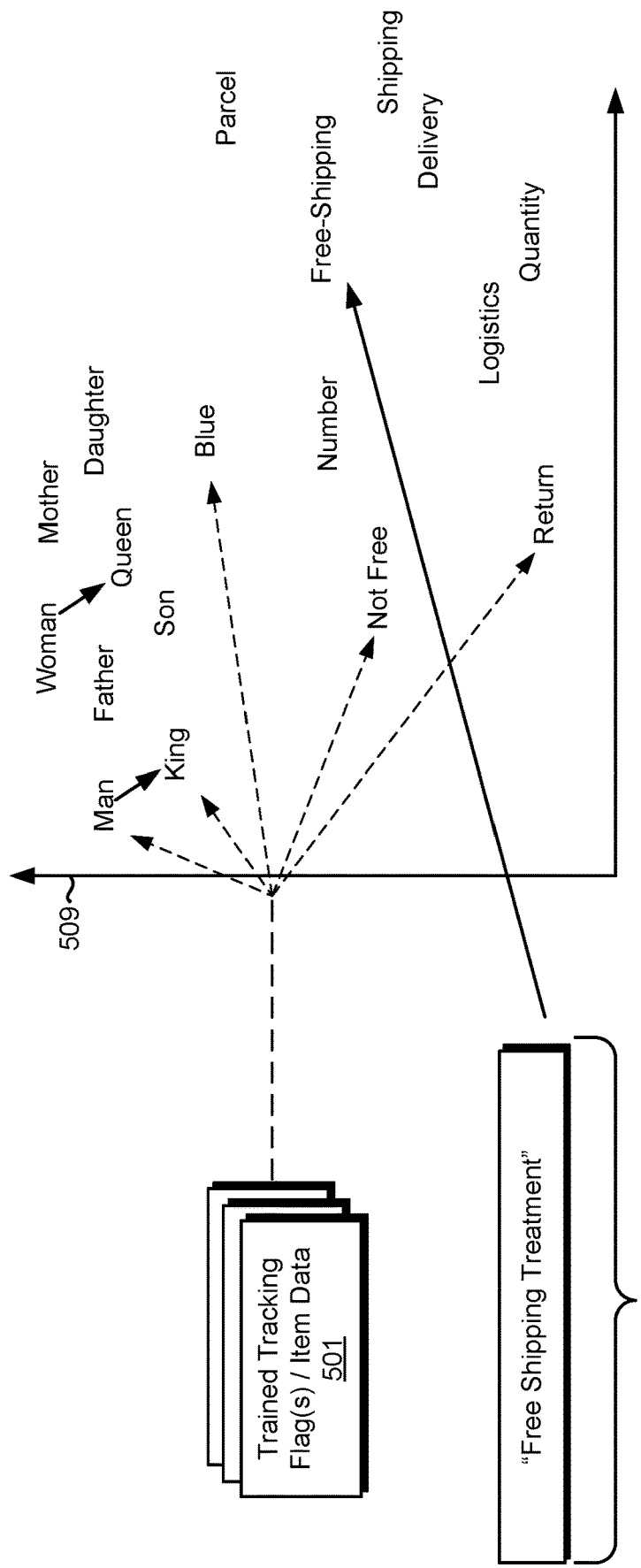
FIG. 5 is a schematic diagram illustrating how vectors associated with words are run through an NLP-based model that outputs a word embedding, according to some embodiments.

FIG. 5 is a schematic diagram illustrating how vectors associated with words are run through an NLP-based model that outputs a word embedding, according to some embodiments. In some embodiments, functionality described with respect to FIG. 5 is performed or used by test case—test data candidate mapping component 109. In some embodiments, FIG. 5 represents the NLP model(s) 406 of FIG. 4 and/or the feature space 206 of FIG. 2 The feature space 509 includes multiple vectors (e.g., "shipping" or "logistics") illustrated in natural language text for convenience but are typically represented as vectors. It is understood that the vector space 509 is representative only and that any suitable vectors according to a particular application can be represented.

In some embodiments, the NLP-based model of FIG. 5 is a WORD2VEC model. A word2vec model is a two-layer neural network model that runs one or more input vectors (e.g., characters of the test case identifier 507) through a hidden layer (i.e., a column-row matrix) and a projection layer (e.g., a softmax classifier). Word2vec models predict target strings (e.g., "shipping" in the feature space 509) from source context words (i.e., via the Continuous Bag of Words (CBOW) algorithm) or inversely predict source-context words from target words (i.e., via the skip-gram algorithm). In embodiments, when words are processed through a corresponding Word2vec or other word embedding model, the words are numerically represented in a word embedding that shows associated vectors and the distances from the string representations to each of those vectors, which is described in more detail below.

In order to embed or place points or vectors within the vector space 509, the model is trained using training data—i.e., the trained tracking flag(s)/item data 501 (words of individual test data candidates). In various embodiments, the training data includes a large corpus of unstructured data semi-structured, and/or structured data. The training data 501 is also an input of the NLP-based model. The training data includes some or each of the words as found within the feature space 509—man, king, delivery, etc.

In some embodiments, the feature space 509 represents a "pre-trained" embedding. A pre-trained embedding is a static model that is generated without feedback, retraining, or reference to the data sets being fed through it. For example, a user may download a static word embedding from an online source, which is already trained and includes the vectors or data points already mapped in vector space according to semantic similarity between words. In other embodiments, the vector space 509 represents a "retrained" or trained embedding. A retrained or trained word embedding receives training feedback after it has received initial training session(s) and is optimized or generated for a specific data set (e.g., for specific listings that include specific tracking tags or item information).

In order to map each of the word of the trained data 501 (or the test case identifier 507) to its contextually appropriate point in the vector space 509, training algorithms are utilized. For example, in some embodiments, the NLP-based model is trained using the maximum likelihood (ML) principle to maximize probability of the next word $w_t$ (i.e., "target") given the previous words h (i.e., "history") in terms of a softmax function:

$$P(w_t \mid h) = \text{softmax}(\text{score}(w_t, h))$$

$$= \frac{\exp\{\text{score}(w_t, h)\}}{\sum \text{word } w' \text{ in } Vocab^{\exp\{\text{score}(w', h)\}}}$$

Where score ($w_t$, h) computes the compatibility of word $w_t$ with the context h. The model is trained by maximizing its log-likelihood on the training set, that is maximizing $$J_{ML} = \log P(w_t \mid h)$$

$$= \text{score}(w_t, h) - \log\left(\sum \text{Word } w' \text{ in } Vocab \; \exp\{\text{score}(w', h)\}\right)$$

This yields a properly normalized probabilistic model for language modeling. Each probability is computed and normalized using the score for all other words w' in the current context h at every training step. In some embodiments, some models, such as WORD2VEC, are trained using a binary classification objective, such as logistic regression, to discriminate the real target words $w_t$ from K noise words w", in the same context. Accordingly, instead of a softmax classifier, a noise classifier is used.

The output of the training algorithms and/or actual data input is each of the positional words in the vector space 509, which shows groupings of words that are similar (e.g., semantically similar). "Semantic similarity" is the semantic distance between two or more concepts (e.g., vectors representing tracking flag(s)/item data and vectors representing test case identifiers). The "distance" between any two or more words in some embodiments is based on the similarity of their meaning and/or semantic content, as opposed to any syntax similarity.

In some embodiments, the output as represented in the vector space 509 is computed based on a NLP-based model computing semantic similarity between words. For example, a vocabulary set (e.g., all the words in the vector space 509) may first be converted into input vectors via an input vector encoding (e.g., one hot encoding). For example, the word "shipping" may be converted into the vector [1,0,0,0,0]. This vector representation shows various dimensions, where each value corresponds to ordered words (e.g., each word in a set of trained test data candidates) and whether the word is TRUE or present. Because "shipping" is the only word being run through the NLP-based model in this example, the integer 1 is used to indicate its representation. "Shipping" does not contain any of the other words within it (e.g., "blue" or "man") so the other values are represented as 0. In some embodiments, based on generating the softmax function above or the output layer of the neural network, an output embedding vector representation can be generated, which is indicative of the actual coordinates that a vector will be embedded or placed in vector space 509 based on semantic similarity to other words and/or averaging or otherwise combining the output embedding vectors for all of the words within a particular search result candidate or test case identifier. For example, using the illustration above, the "shipping" vector [1,0,0,0,0] can be converted to an output layer vector [1,2], which is the 2-dimensional plotting coordinates in vector space 509.

The distance between any two vectors or words is measured according to any suitable method. For example, in some embodiments, automated cosine similarity is used to compute distance. Cosine similarity is a measure of similarity between two non-zero vectors of an inner product space that measures the cosine of the angle between the two non-zero vectors. In these embodiments, no similarity is expressed as a 90 degree angle, while total similarity (i.e., the same word) of 1 is a 0 degree angle. For example, a 0.98 distance between two words reflects a very high semantic similarity while a 0.003 distance reflects little semantic similarity. As illustrated in the vector space 509, for example, the cosine similarity between "man" and "king" and "woman" and "king" are the same cosine distance, thus "king" in certain situations is semantically similar to "king" given the different input of "man" and "woman" are used. In some embodiments, the distance is represented as an average distance or the distance between a particular vector in vector space 509 and an average of other terms. In some embodiments, the distance is represented via fuzzy matching.

In some embodiments, FIG. 5 represents or includes a word-category co-occurrence matrix (e.g., a compilation of vector spaces). A matrix includes one or more vectors of a first vector space multiplied by one or more vectors of a second vector space (e.g., multiplying each word in a test case identifier and/or test data candidate to get a final distance). This allows rows within the vector space to be normalized for summing to 1 to become a probability distribution. Words or vectors can be compared using their category distribution. In some embodiments, each vector representing a word in a test case identifier and/or test data candidate is combined or aggregated (e.g., via a dot product operation) with another word in the test case identifier and/or test data candidate in order to get an aggregated score or distance any particular test case identifier is to a particular test result candidate (e.g., a particular tracking flag and/or item tag).

After the training data 501 is run through the training algorithm, the output is represented in the vector space 509. In some embodiments, in response to generating the training data 501 in the vector space 509, the test case identifier 507 "free shipping treatment" is received (e.g., at runtime). This corresponds to a test case that is to test a free shipping feature on a software application for application testing. In response to receiving the test case identifier 507, particular embodiments map each word in the test case identifier 507 according to its semantic similarity to other words within the vector space 509 (i.e., all of the trained tracking flag(s)/item data). For example, the test case identifier 507 term "shipping" can be mapped to its place in vector space 509. As described herein, some embodiments aggregate or combine such mapping (e.g., via a dot product function) with other mappings of the test case identifier 507 in order to determine the overall or aggregated distance between the query test case identifier 507 and individual test data candidates or tracking flag(s)/item data. For example, FIG. 5 illustrates that that the test case identifier 507 is closest, in distance, to the terms "shipping" and "free," which can be aggregated and mapped to the test data candidate "FREE_SHIPPING." Accordingly, "FREE_SHIPPING", for example can represent the test data candidate 408 of FIG. 4 or what is suggested by the parameter suggestion component 111 of FIG. 1.

Figure 6:
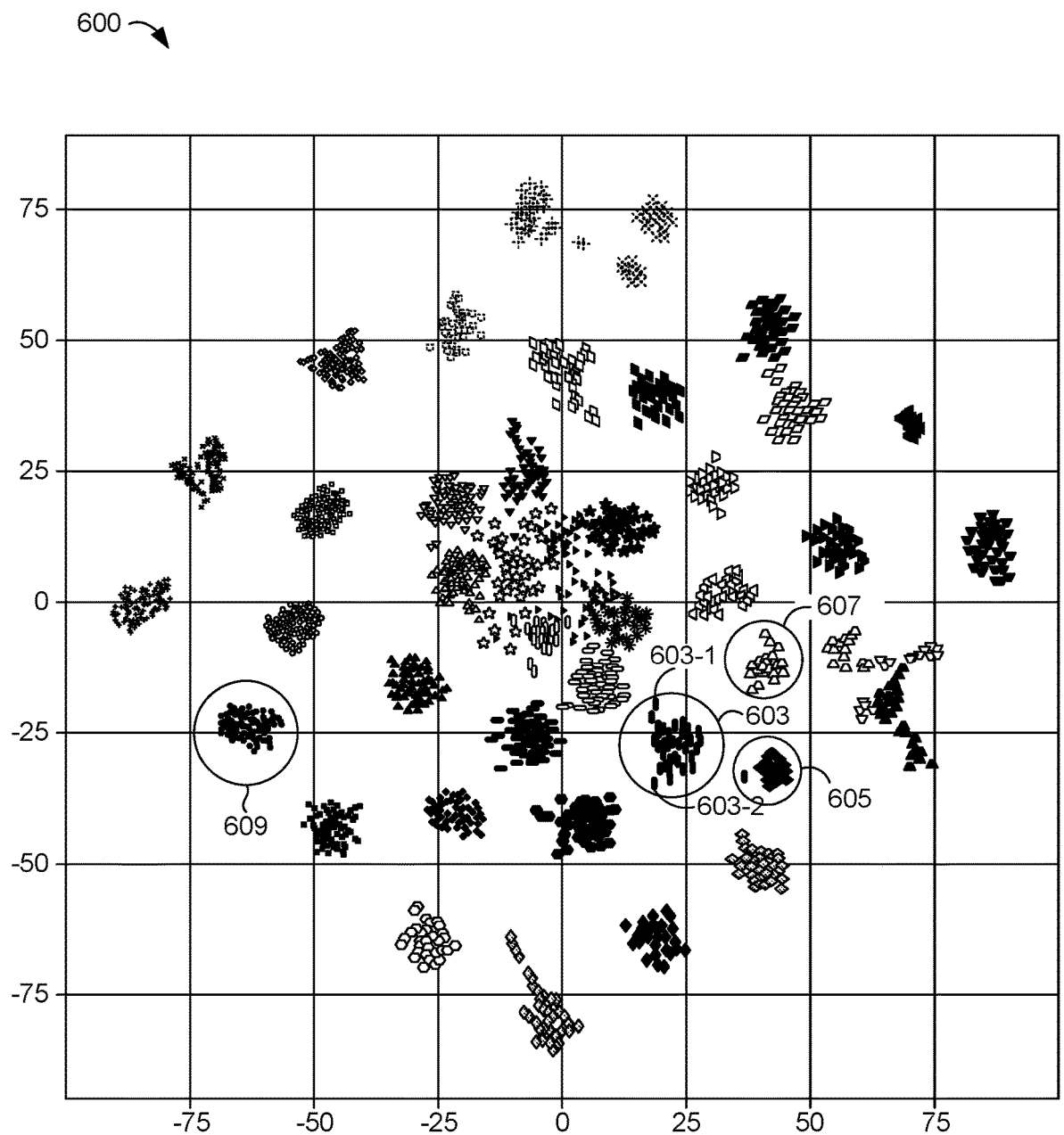
FIG. 6 is a schematic diagram of an example visualization of feature space that illustrates various feature vectors representing one or more test case identifiers and/or test data candidates that have been clustered, according to some embodiments.

FIG. 6 is a schematic diagram of an example visualization of feature space 600 that illustrates various feature vectors representing one or more test case identifiers and/or test data candidates (e.g., tracking flag(s)/item data) that have been clustered, according to some embodiments. In some embodiments, the feature space 600 represents the functionality produced (or used) by the test case—test data candidate mapping component 109 to determine what cluster a particular feature vector belongs to in order to recommend or use particular test data candidates as input to a test case. In some embodiments, the feature space 600 represents the feature space 206 of FIG. 2 and/or the NLP model(s) 406 of FIG. 4. In an illustrative example of FIG. 6, if a first test case identifier is mapped in feature space to a first cluster, all of the test data candidates within the first cluster can be recommended or used as input for a particular test case that the first test case identifier represents.

In some embodiments, the vector space 600 includes clusters of data points (e.g., data point 603-1 and data point 603-2) representing individual feature vectors corresponding to specific test data candidates and/or test case identifiers (e.g., test cases or test scenarios). These data points are formed together to form a particular cluster. For example, using the illustration above, the data point 603-1 may read "FREE_SHIPPING" and data point 603-2 may read "FREE_SHIPPING_AFTER_HOLIDAYS," which both belong to the cluster 603 (indicative that the feature values of the data points 603 are within a threshold distance to or similar to other trained data points). There are other clusters 605 (e.g., "no free shipping") and the cluster 607.

In an illustrative example of how the feature space 600 is used, embodiments may receive a test case identifier and/or other inputs (e.g., semantically similar words closest to the test case identifier 507 as indicated in the feature space 509 of FIG. 5) in order to predict what test case data to use for the corresponding test case. Responsively, some embodiments run the test case identifier through one or more machine learning models in order to weight features for the test case identifier, after which a feature vector (e.g., representing the data point 603-1) is embedded in the feature space 600. The feature space 600 in various embodiments represents a multidimensional coordinate system where each feature is associated with one or more dimensions. For example, a first set of values in a vector may represent whether particular words are present in the vector (e.g., "shipping"), where a first axis represents the first set of values and a second axis represents a second set of values of the same vector (e.g., the word "free"), which may represent whether another set of words are present. Each feature value within the feature vector may be summed or otherwise aggregated to arrive at a final coordinate point (e.g., the data point 603-2) within the feature space 600. In this way, some embodiments map test data candidates and/or test case identifiers in the feature space 600 based on its semantic and/or text match similarity to each other. Each of the data points within the cluster 603, for example, are within a feature similarity threshold and so they are close to each other (e.g., based on Euclidian distance) in the feature space 600. In some embodiments, in response to a clustering of a given test case identifier, some or each of the data points (e.g., representing test data candidates) within the same cluster can be recommended or used as input to a test case. For example, if a test case identifier was mapped as 603-1 inside the cluster 603, then each of the data points representing different test data candidates (e.g., 603-2) are recommended or used as inputs into a test case represented by the test case identifier.

The machine learning model(s) are able to cluster samples of new unseen test case identifier and/or test data candidate (e.g., after training). In some embodiments, test data candidate and/or test case identifier is represented by the median of its samples' embeddings as shown below:

$$C_j = \text{median}\{f_{embed}(S_i^j): I=1,2,\ldots,n\]$$

Where $f_{embed}$ the output of the model, $S_i^j$ is the $i^{th}$ sample of the $j^{th}$ class. The prediction for any test sample X is given by:

$$Pred(X) = \arg\min_j \|C_j \cdot f_{embed}(X)\|.$$

However, it is understood that median is just one way to represent an embedding. Some embodiments alternatively use other statistics like mean, pth percentile, and the like.

FIG. 7 is a table 700 that represents various examples of test case identifiers and their mapped test data candidates, according to some embodiments. In some embodiments, the table 700 represents a data structure (e.g., a hash map or lookup table) used (e.g., by the test case—test data candidate mapping component 109) to map test case identifiers to their corresponding test data candidates. In some embodiments, each of the test case identifiers in FIG. 7 represents the test case identifier 202 of FIG. 2. In some embodiments, each of the test case identifiers in FIG. 7 represent what is included in the manual test(s) 311, 402 and/or 402, 404 of FIGS. 3 and 4 respectively. In some embodiments, each of the test case identifiers in FIG. 7 represents the test case identifier 507 of FIG. 5. In some embodiments, each of the test case identifiers in FIG. 7 are represented as clustered data points, as illustrated in FIG. 6.

In some embodiments, each of the test data candidates in FIG. 3 represents some or all of the extracted data of the item listing 204 of FIG. 2. In some embodiments, the test data candidates in FIG. 7 represent the data store 307 and/or or each of them represent the predicted tracking flag(s)/item data 408 of FIG. 4 (or 309). In some embodiments, each of the test data candidates in FIG. 7 represents the trained tracking flag(s)/item data 501 of FIG. 5. In some embodiments, each of the test data candidates in FIG. 7 are represented as clustered data points, as illustrated in FIG. 6.

Each test case identifier of FIG. 7 is mapped to a corresponding test data candidate via the table 700. For example, the test case identifier in the first entry "mWeb Picture panel—Single image" is mapped to the test data candidate of, "NUMBER_OF_PICTURES=1." Accordingly, "NUMBER_OF_PICTURES=1" can be recommended or automatically used as input into the test case "mWeb Picture panel—Single image." As described herein, NLP-based models and/or other machine learning functionality (e.g., K-means clustering) can be used to map each test case identifier to each test data candidate. For example, using the illustration above, a NLP-based model (e.g., a WORD2VEC) can map, via semantic distance, the word "single" in the test case identifier to the symbol "1" in the test data candidate as being close to each other or meaning the same thing semantically. The NLP-based model can likewise map "image" and "picture" as semantically close in distance with each other. Based on this comparison using NLP, embodiments can tag the attributes on the right hand side of the table 700 has test data candidates.

Figure 8:
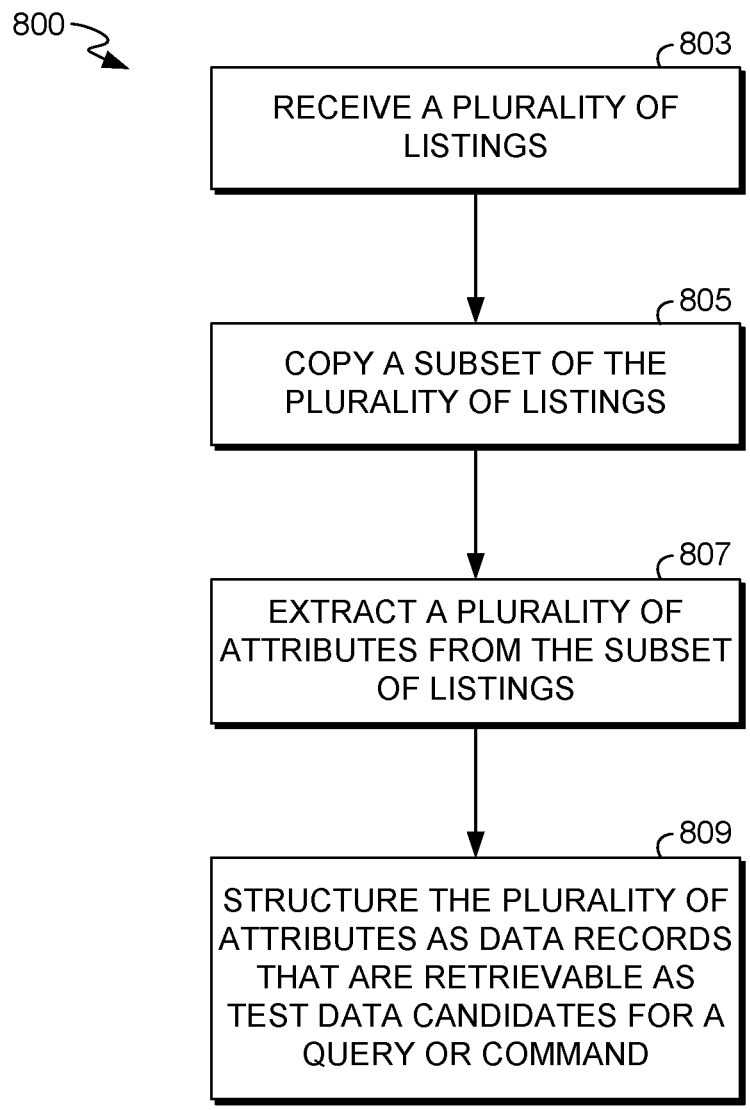
FIG. 8 is a flow diagram of an example process for generating test data candidates from listings, according to some embodiments.

FIG. 8 is a flow diagram of an example process 800 for generating test data candidates from listings, according to some embodiments. In some embodiments, the process 800 represents the functionality described with respect to FIG. 3. The process 800 (and/or any operation described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the computerized system (that includes computer storage memory and one or more processors), and/or the computer storage media as described herein may perform or be caused to perform the processes 800 and/or any other functionality described herein.

Per block 803, a plurality of listings is received. In some embodiments, each listing is an item listings that describes an item for sale in an electronic marketplace. An "electronic marketplace" is any application (e.g., web application or locally stored app), service, or online platform that offers items and/or services for sale, where users interacting with listings can become buyers of corresponding items. In some embodiments, third parties (e.g., vendor sellers) provide the listings to merchants who provide or own the application/platform that hosts the item listings. In some embodiments, merchants themselves alternatively or additionally provides the listings for items they sell. For example, a merchant can generate and own a web application that includes item listings for sale by the merchant.

Per block 805, some embodiments copy a subset of the plurality of listings. Examples of block 805 are described with respect to the item listing selection component 103 of FIG. 1. Some embodiments copy the subset of listings, as raw data, from a first data store into a staging data store. Examples of this are described with respect to the data store 303 and data store 305 of FIG. 5, where listings are copied from the data store 303 into the data store 305. As described herein, the staging data store may be a part of an ETL process where listings are temporarily copied in preparation to be formatted or tagged into a target data store (e.g., the data store 307). Some embodiments anonymize (e.g., encrypt, obfuscate, mask, hide, or delete) user sensitive data indicated in the first data store such that the staging data score includes the anonymized user sensitive data. For example, in response to copying listings from the data store 303 to the staging data store 305, various embodiments encrypt, at the staging data store 305, any user sensitive data indicated in each listing, such as a seller's name, address, phone number, and the like.

Per block 807, particular embodiments extract a plurality of attributes from the subset of listings. Examples of block 807 are described with respect to the item listing attribute extraction component of FIG. 7. In some embodiments, the plurality of attributes from a single listing represent the tracking flags from the listing, the item data from the listing, and/or the seller data from the listing. Examples of this are described with respect to the tracking flag(s)/item data 309, the predicted tracking flag(s)/item data 408 of FIG. 4, the trained tracking flag(s)/item data of FIG. 5, and the search result candidates in the table 700 of FIG. 7. In an illustrative example of block 807, NLP components can tokenize and parse metadata and listing words from a single listing (e.g., "NOT_FREE_SHIPPING" and "PRICE: $45.00").

Per block 809, particular embodiments structure the plurality of attributes as data records that are retrievable as test data candidates for a query (e.g., when manual tests are used) or command (e.g., when automated tests are used). In these embodiments, all extracted attributes of a single listing are aggregated or consolidated into a respective single tag, entry, or data record. For example, all of the attributes extracted from the item listing 204 of FIG. 2 are consolidated into a single record, which represents the feature vector 210. Examples of block 809 are described with respect to the tracking flag(s)/item data record 309 of FIG. 9 and the predicted tracking flag(s)/item data record 408 of FIG. 4.

Some embodiments "structure" the plurality of attributes by at least generating an index for the plurality of attributes such that the plurality of attributes can be queried (or a record that contains all the attributes can be queried). "Structuring" can additionally or alternatively include formatting the extracted attributes for a given listing into a data record (e.g., a database row). Structuring can alternatively or additionally include generating primary keys or database tables based on all the extracted attributes received. In some embodiments, structuring is part of the "Transform" step in ETL processes.

In some embodiments, the plurality of attributes are transmitted (e.g., by an electronic marketplace service (e.g., a merchant) and over a computer network) to a discovery service, such that the discovery service services (or executes) the query or command. A discovery service corresponds to an entity that is distinct from the electronic marketplace. For example, the discovery service can correspond to a different host machine having a different port or address relative to the electronic marketplace. In another example, the discovery service may correspond to a cloud computing node or third party server that is communicatively coupled to the electronic marketplace's host cloud computing node or server.

In some embodiments, the discovery service is the entity that performs block 809 and the electronic marketplace entity performs the rest of the steps 803, 805, and 807. For example, in response to the electronic marketplace host performing block 807, the electronic marketplace host may transmit the plurality of attributes, over a computer network (e.g., via TCP/IP) and via an API, to the discovery service, at which point the discovery service structures the plurality of attributes according to block 809. Examples of the discovery service are described with respect to FIG. 3 and FIG. 4. Alternatively, in some embodiments, the electronic marketplace entity performs all of the process 800.

Figure 9:
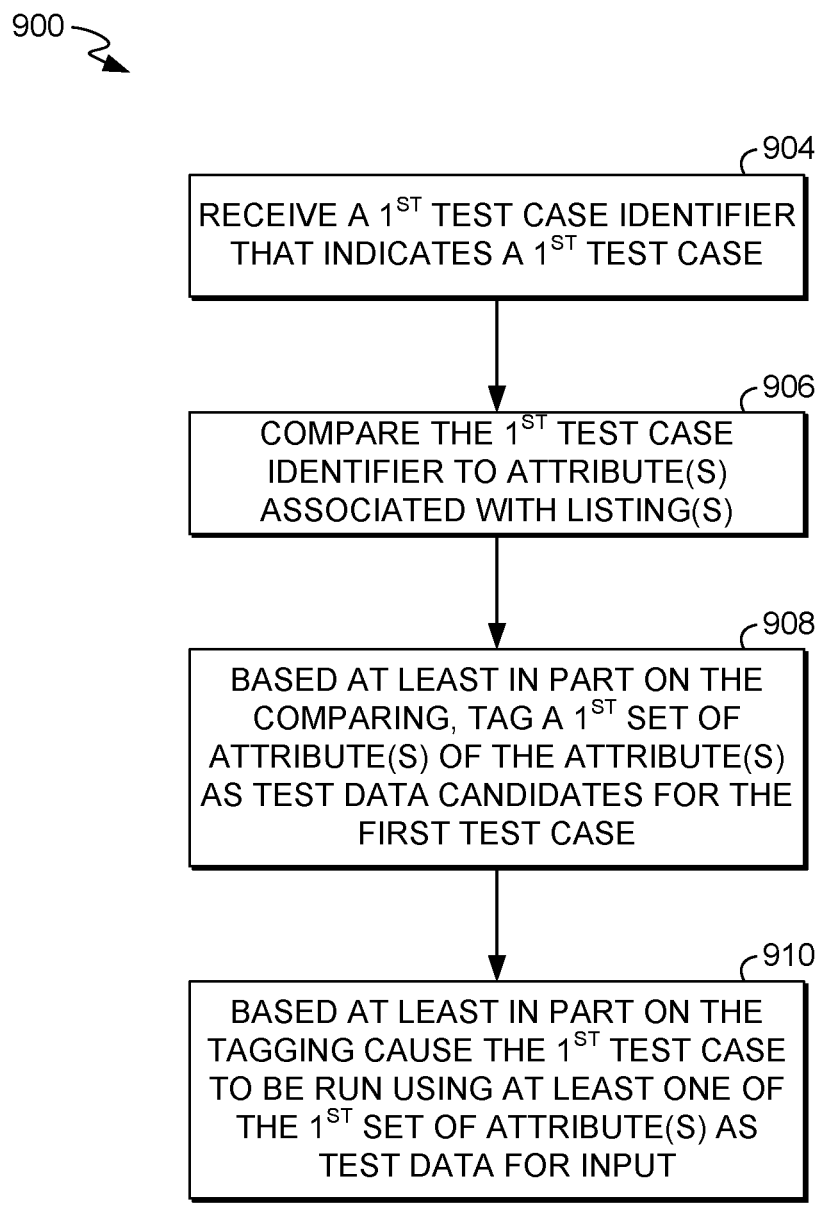
FIG. 9 is a flow diagram of an example process for causing a first test case to be run using one or more test data candidates as input, according to some embodiments.

FIG. 9 is a flow diagram of an example process 900 for causing a first test case to be run using one or more test data candidates as input, according to some embodiments. In some embodiments, the process 900 represents the functionality as described with respect to FIG. 4 and vice versa. In some embodiments, the process 900 occurs after the process 800 of FIG. 8 such that the test data candidates indicated at block 908 have already been structured as data records per block 809 of FIG. 8 and ready to be used to run test cases. In some embodiments, a discovery service, as described herein, performs the process 900.

Per block 904, a first test case identifier that indicates a first test case is received. The term "indicates" or "test case identifier" in this context refers to being associated with a test case but not necessarily a test case. For example, the first test case identifier can refer to a natural language description of a test scenario or a natural language description of a test case. A "test scenario" typically refers to a collective set of test cases and gives a high-level natural language description of what needs to be tested. In some embodiments, a "test case" is indicative of testing one or more features of an application associated with the electronic marketplace before the application is deployed (e.g., offered for sale, published to end-users, or used by end-users). However, in some embodiments, the testing need not occur before an application is deployed but can happen after the application is deployed (e.g., to test a new feature of an already-deployed application). In some embodiments, a "test case" as described herein refers to a set of actions executed to verify a particular feature or functionality of a software application. A single test case typically contains various information, such test steps, test data, preconditions (e.g., a statement describing that steps or actions need to occur before the test case begins), post-conditions (e.g., a statement describing the outcome of an action or target outcome of an action, such as the work a test case step has accomplished), specific variables or conditions, and the like.

In an illustrative example of the distinction between a test scenario and a test case, consider the following. Test cases for the Test Scenario: "Check the Login Functionality" may include the following: (1) Check system behavior when valid email id and password is entered. (2) Check system behavior when invalid email id and valid password is entered. (3) Check system behavior when valid email id and invalid password is entered. (4) Check system behavior when invalid email id and invalid password is entered. (5) Check system behavior when email id and password are left blank and Sign in entered. (6) Check forgot your password is working as expected. (7) Check system behavior when valid/invalid phone number and password is entered. (8) Check system behavior when "Keep me signed" is checked.

In some embodiments the first test case identifier is a part of or associated with an automated test case and/or a manual test case. For example, referring back to FIG. 3 and FIG. 4, the first test case identifier may describe a test case to be used in the manual test(s) 311, 402, and/or the automated test(s) 313, 404.

Per block 906, various embodiments compare the first test case identifier to attribute(s) of the listing(s) (that describe item(s) for sale in an electronic marketplace). In some embodiments, the attribute(s) at block 906 are already structured, such as in individual data records, as described with respect to block 809 of FIG. 8. Examples of block 906 are described with respect to the test case—test data candidate mapping component 109 of FIG. 1, the feature space 206 of FIG. 2, and/or the NLP model(s) 406 of FIG. 4. In some embodiments, the comparing at block 906 includes comparing one or more natural language characters within the first case identifier with other natural language identifiers within the plurality of attributes using natural language processing, as described with respect to the test case—test data candidate mapping component 109 of FIG. 9. Alternatively or additionally, in some embodiments, the "comparing" at block 906 includes using a machine learning model that maps a first feature vector representing the first test case identifier to a second feature vector representing the attribute(s) of the listing(s) and determining a distance (e.g., a Euclidian or Cosine distance) between the first feature vector and the second feature vector. Examples of these embodiments are described with respect to mapping the vector 210 and 212 of FIG. 2 in the feature space 200. Other examples include the word embedding of FIG. 5 and the clustering algorithm of FIG. 6. In this way "comparing" as described herein need not refer to comparing the actual payload or natural language characters of the first test case identifier and the attribute(s) of the listing(s). Rather, the comparing can be between representations (e.g., feature vectors) of the first test case identifier and the attribute(s) of the listing(s). And "comparing" can include mapping or determining distances between feature vectors in vector space.

Per block 908, based at least in part on the comparing, some embodiments tag a first set of attribute(s) (or a record structured at block 809 that includes the first set of attribute(s)) of the attribute(s) as test data candidates for the first test case. In some embodiments, the term "tagging" includes computer functionality that generates a tag, flag, and/or other indicator (e.g., next to the first set of attribute(s) or record) to indicate that the first set of attribute(s)) are test data candidates for the first test case. For example, in "tag" embodiments, tagging can include inserting metadata or keyword in a field next to the first set of attribute(s). Alternative or in addition to "tagging," some embodiments "determine" that the first set of attributes (or record that contains the first set of attributes), of the attribute(s), are test data candidates to be used as input to the first test case. In an illustrative example of block 908, embodiments can include recommending tracking flags, item data, and/or seller data from a listing (and/or the data record that contains such information).

Per block 910, based at least in part on the tagging (or determining), some embodiments cause the first test case to be run using at least one of the first set of attribute(s) as test data for input. Examples of this are described with respect to 408 and 410 of FIG. 4. For example, some embodiments "cause" the first test case to be run by providing the at least one of the first set of attribute(s) as a notification to a tester or programmer (e.g., input the first set of attribute(s) into programming notes of a test test) in manual testing environments, where a test case is run based on manual input of the first set of attribute(s) as test data by the tester or programmer. Alternatively, some embodiments "cause" the first test case to be run automatically in automatic testing environments by automatically providing the first set of attribute(s) as test data input for a test case.

Figure 10:
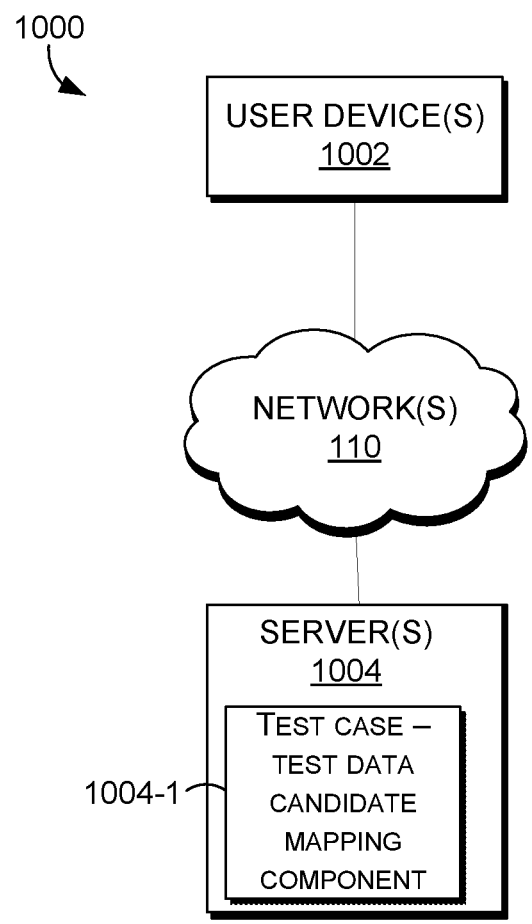
FIG. 10 is a block diagram of a computing environment in which aspects of the present technology are implemented within, according to some embodiments.

FIG. 10 is a block diagram of a computing environment 1000 in which aspects of the present disclosure are employed in, according to certain embodiments. Although the environment 1000 illustrates specific components at a specific quantity, it is recognized that more or less components may be included in the computing environment 1000. For example, in some embodiments, there are multiple user devices 1002 and multiple servers 1004, such as nodes in a cloud or distributing computing environment. In some embodiments, some or each of the components of the system 100 of FIG. 1 are hosted in the one or more servers 1004. In some embodiments, the user device(s) 1002 and/or the server(s) 1004 may be embodied in any physical hardware, such as the computing device 1100 of FIG. 11. The server(s) 1004 include the test-case test data candidate mapping component 1004-1. In some embodiments, the test-case test data candidate mapping component 1004-1 represents or includes identical functionality as the test case—test data candidate mapping component 109 of FIG. 1.

The one or more user devices 1002 are communicatively coupled to the server(s) 1004 via the one or more networks 110. In practice, the connection may be any viable data transport network, such as, for example, a LAN or WAN. Network(s) 110 can be for example, a local area network (LAN), a wide area network (WAN) such as the Internet, or a combination of the two, and include wired, wireless, or fiber optic connections. In general, network(s) 110 can be any combination of connections and protocols that will support communications between the control server(s) 1004 and the user devices 1002.

In some embodiments, a user issues a query on the one or more user devices 1002, after which the user device(s) 1002 communicate, via the network(s) 110, to the one or more servers 1004 and the one or more servers 1004 executes the query (e.g., via one or more components of FIG. 1) and causes or provides for display information back to the user device(s) 1002. For example, the user may issue a query at the user device 1002 that specifies a test case identifier. Responsively, based on comparing a test case identifier of the test case to item listing attributes, the server(s) 1004 tag the item listing attributes as test data candidates for the test case, as described with respect to block 908.

The invention may be described in the general context of computer code or machine-useable instructions, including computer-executable instructions such as program modules, being executed by a computer (or one or more processors) or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 11:
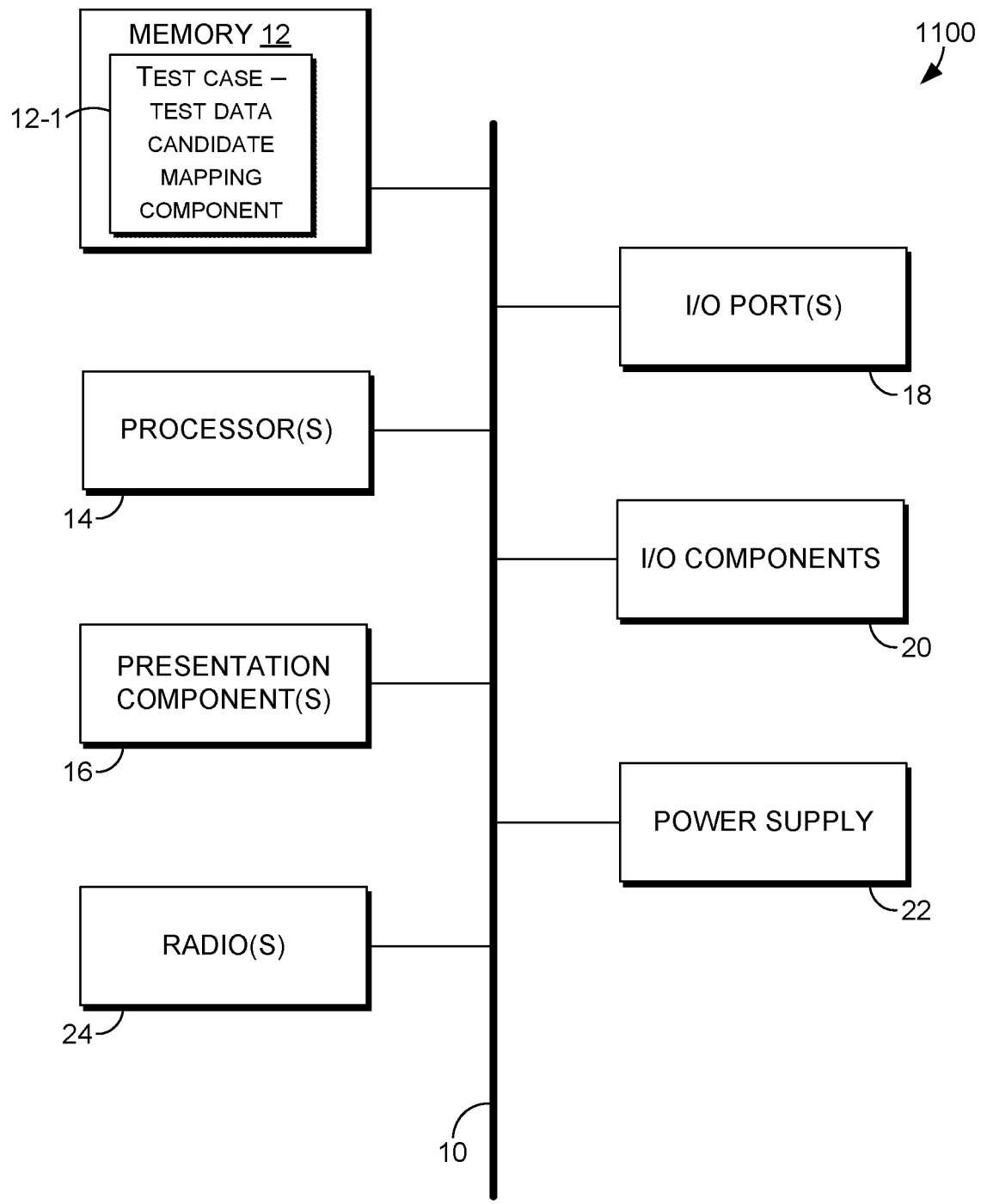
FIG. 11 is a block diagram of a computing device in which aspects of the present disclosure are implemented within, according to some embodiments.

With reference to FIG. 11, computing device 1100 includes bus 10 that directly or indirectly couples the following devices: memory 12, one or more processors 14, one or more presentation components 16, input/output (I/O) ports 18, input/output components 20, and illustrative power supply 22. Bus 10 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that this diagram is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

In some embodiments, the computing device 1100 represents the physical embodiments of one or more systems and/or components described above. For example, the computing device 1100 can represent: the one or more user devices 1002, and/or the server(s) 1004 of FIG. 10. The computing device 1100 can also perform some or each of the blocks in the process 800, 900 and/or any functionality described herein with respect to FIGS. 1-10. It is understood that the computing device 1100 is not to be construed necessarily as a generic computer that performs generic functions. Rather, the computing device 1100 in some embodiments is a particular machine or special-purpose computer. For example, in some embodiments, the computing device 1100 is or includes: a multi-user mainframe computer system, one or more cloud computing nodes, a single-user system, or a server computer or similar device that has little or no direct user interface, but receives requests from other computer systems (clients), a desktop computer, portable computer, laptop or notebook computer, tablet computer, pocket computer, telephone, smart phone, smart watch, or any other suitable type of electronic device.

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors 14 that read data from various entities such as memory 12 or I/O components 20. Presentation component(s) 16 present data indications to a user or other device. Exemplary presentation components include a display device, speaker, printing component, vibrating component, etc.

I/O ports 18 allow computing device 800 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion.

As described above, implementations of the present disclosure relate to automatically generating a user interface or rendering one or more applications based on contextual data received about a particular user. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" or "component" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first cache), second (e.g., second cache), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

What is claimed is:

1. A computerized system comprising:
one or more processors; and
computer storage memory having computer-executable instructions stored thereon which, when executed by the one or more processors, implement a method comprising:
receiving one or more listings, each listing of the one or more listings describes an item for sale in an electronic marketplace;
extracting a plurality of attributes from the one or more listings, the plurality of attributes include a first set of natural language characters that indicate one or more attributes of the one or more listings;
receiving a first test case identifier that describes, via a second set of natural language characters, a first test case, the first test case is indicative of testing one or more features of an application of the electronic marketplace;
comparing the first set of natural language characters to the second set of natural language characters;
based at least in part on the comparing, tagging a first set of attributes, of the plurality of attributes, as test data candidates to be used as input to the first test case; and
based at least in part on the tagging, causing the first test case to be run using at least one of the first set of attributes as test data for input.

2. The system of claim 1, wherein the first test case is one of an automated test case or a manual test case.

3. The system of claim 1, wherein the comparing is based on using natural language processing.

4. The system of claim 1, wherein the comparing includes using a machine learning model that maps a first feature vector representing the first test case identifier to a second feature vector representing the plurality of attributes and determining a distance between the first feature vector and the second feature vector.

5. The system of claim 1, wherein the method further comprises copying the one or more listings, as raw data, from a first data store into a staging data store.

6. The system of claim 5, wherein the method further comprises anonymizing user sensitive data indicated in the first data store such that the staging data store includes the anonymized user sensitive data.

7. The system of claim 1, wherein the method further comprising generating an index for the plurality of attributes such that the plurality of attributes can be used for a query or command.

8. The system of claim 1, wherein the method further comprises transmitting the plurality of attributes to a discovery service, wherein the discovery service performs the tagging, and wherein the discovery service corresponds to an entity that is distinct from the electronic marketplace.

9. The system of claim 1, wherein the first set of attributes include at least one of: tracking flags from the one or more listings, item data from the one or more listings, and seller data from the one or more listings.

10. A computer-implemented method comprising:
receiving a first test case identifier that describes, via a first set of natural language characters, a first test case, the first test case is indicative of testing one or more features of an application of an electronic marketplace;
comparing a representation of the first set of natural language characters to a representation of a second set of natural language characters included in a plurality of attributes, the plurality of attributes being associated with one or more listings that describe one or more items for sale in the electronic marketplace;
based at least in part on the comparing, determining that a first set of attributes, of the plurality of attributes, are test data candidates to be used as input to the first test case; and
based at least in part on the determining, causing the first test case to be run using at least one of the first set of attributes as test data for input.

11. The method of claim 10, wherein the first test case is one of an automated test case or a manual test case, and wherein the application is not yet deployed.

12. The method of claim 10, wherein the comparing includes comparing one or more natural language characters within the first test case identifier with other natural language characters within the plurality of attributes using natural language processing.

13. The method of claim 10, wherein the comparing includes using a machine learning model that maps a first feature vector representing the first test case identifier to a second feature vector representing the plurality of attributes and determining a distance between the first feature vector and the second feature vector.

14. The method of claim 10, further comprising copying the one or more listings, as raw data, from a first data store into a staging data store.

15. The method of claim 14, further comprising anonymizing user sensitive data indicated in the first data store such that the staging data store includes the anonymized user sensitive data.

16. The method of claim 10, further comprising generating a record for the plurality of attributes such that the plurality of attributes can be used for a query or command.

17. The method of claim 10, wherein the plurality of attributes are structured as one or more records such that the one or more records are configured to be queried by a discovery service, the discovery service corresponds to an entity that is distinct from the electronic marketplace.

18. The method of claim 10, wherein the first set of attributes include tracking flags from the one or more listings and item data from the one or more listings.

19. One or more computer storage media having computer-executable instructions embodied thereon that, when executed, by one or more processors, cause the one or more processors to perform a method, the method comprising:
receiving a first test case identifier that describes, via a first set of natural language characters, a first test case, the first test case is indicative of testing one or more features of an application of an electronic marketplace;
comparing the first set of natural language characters to a second set of natural language characters included in a plurality of attributes, the plurality of attributes being associated with one or more listings that describe one or more items for sale in the electronic marketplace;
based at least in part on the comparing, determining that a first set of attributes, of the plurality of attributes, are test data candidates to be used as input to the first test case; and
based at least in part on the determining, causing the first test case to be run using at least one of the first set of attributes as test data for input.

20. The one or more computer storage media of claim 19, wherein the plurality of attributes are structured as one or more records in a different format relative to a format structured by the electronic marketplace.

* * * * *